US009787138B2

(12) United States Patent
Ichikawa

(10) Patent No.: US 9,787,138 B2
(45) Date of Patent: Oct. 10, 2017

(54) POWER RECEPTION DEVICE AND POWER TRANSMISSION DEVICE

(75) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 417 days.

(21) Appl. No.: 14/398,811

(22) PCT Filed: Jun. 4, 2012

(86) PCT No.: PCT/JP2012/064388
§ 371 (c)(1),
(2), (4) Date: Nov. 4, 2014

(87) PCT Pub. No.: WO2013/183105
PCT Pub. Date: Dec. 12, 2013

(65) Prior Publication Data
US 2015/0130288 A1 May 14, 2015

(51) Int. Cl.
H02J 17/00 (2006.01)
H01F 38/14 (2006.01)
H02J 5/00 (2016.01)
B60L 11/18 (2006.01)
H01F 38/30 (2006.01)
(Continued)

(52) U.S. Cl.
CPC .............. *H02J 17/00* (2013.01); *B60L 11/182* (2013.01); *H01F 27/025* (2013.01); *H01F 27/085* (2013.01); *H01F 27/266* (2013.01); *H01F 27/32* (2013.01); *H01F 38/14* (2013.01);
(Continued)

(58) Field of Classification Search
CPC combination set(s) only.
See application file for complete search history.

(56) References Cited

U.S. PATENT DOCUMENTS 7,741,734 B2   6/2010   Joannopoulos et al.
2007/0222542 A1   9/2007   Joannopoulos et al.
(Continued)

FOREIGN PATENT DOCUMENTS

AU   2006269374 B2   1/2007
AU   2006269374 C1   1/2007
(Continued)

OTHER PUBLICATIONS

International Search Report issued in International Patent Application No. PCT/JP2012/064388 dated Jun. 26, 2012.

*Primary Examiner* — Rexford Barnie
*Assistant Examiner* — Elim Ortiz
(74) *Attorney, Agent, or Firm* — Oliff PLC

(57) ABSTRACT

A power reception device includes a first case having an accommodation portion formed therein, a core disposed in the first case, a second coil disposed in the first case and provided on the core, a first electrical device disposed in the first case and connected to the second coil, a first insulation member disposed between an inner surface of the first case and the second coil, and between the inner surface of the first case and the first electrical device, and a cooling device that causes a flow of a coolant to cool the second coil and the first electrical device, the second coil and the first electrical device being attached to the inner surface of the first case with the first insulation member interposed therebetween, the first electrical device being disposed upstream in a flow direction of the coolant from the second coil.

17 Claims, 18 Drawing Sheets

(51) Int. Cl.
    *H02J 7/00*       (2006.01)
    *H01F 27/02*     (2006.01)
    *H01F 27/08*     (2006.01)
    *H01F 27/26*     (2006.01)
    *H01F 27/32*     (2006.01)
    *H02J 7/02*       (2016.01)

(52) U.S. Cl.
    CPC .............. *H01F 38/30* (2013.01); *H02J 5/005* (2013.01); *H02J 7/0042* (2013.01); *H02J 7/025* (2013.01)

(56) References Cited

U.S. PATENT DOCUMENTS

| | | |
|---|---|---|
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2011/0254376 A1 | 10/2011 | Sasaki et al. |
| 2014/0240947 A1 | 8/2014 | Nakamura et al. |

FOREIGN PATENT DOCUMENTS

| | | | |
|---|---|---|---|
| AU | 2007349874 A2 | 10/2008 | |
| AU | 2010200044 A1 | 1/2010 | |
| CA | 2 615 123 A1 | 1/2007 | |
| CA | 2 682 284 A1 | 10/2008 | |
| CN | 101258658 A | 9/2008 | |
| CN | 101682216 A | 3/2010 | |
| CN | 101860089 A | 10/2010 | |
| EP | 1 902 505 A2 | 3/2008 | |
| EP | 2 130 287 A1 | 12/2009 | |
| IN | 735/DELNP/2008 | 5/2008 | |
| IN | 6195/DELNP/2009 | 7/2010 | |
| JP | A-2009-501510 | 1/2009 | |
| JP | A-2010-87353 | 4/2010 | |
| JP | 2010268660 A * | 11/2010 | ............ B60L 11/182 |
| JP | A-2010-268660 | 11/2010 | |
| JP | 2011050127 A * | 3/2011 | .............. H02J 7/025 |
| JP | A-2011-49230 | 3/2011 | |
| JP | A-2011-50127 | 3/2011 | |
| JP | 4868089 B2 | 2/2012 | |
| KR | 2008-0031398 A | 4/2008 | |
| KR | 2010-0015954 A | 2/2010 | |
| WO | WO 2007/008646 A2 | 1/2007 | |
| WO | WO 2008/118178 A1 | 10/2008 | |
| WO | WO 2013/183106 A1 | 12/2013 | |

\* cited by examiner

POWER RECEPTION DEVICE AND POWER TRANSMISSION DEVICE

TECHNICAL FIELD

The present invention relates to a power reception device and a power transmission device.

BACKGROUND ART

In recent years, due to concerns with environment, attention has been drawn to a hybrid vehicle, an electric vehicle, and the like, each of which drives driving wheels using electric power from a battery or the like.

Particularly drawing attention in recent years is wireless charging, by which such a battery included in an electrically powered vehicle can be charged in a non-contact manner without using a plug or the like.

A non-contact power feeding device described in Japanese Patent Laying-Open No. 2011-50127, for example, includes a power reception unit and a power transmission unit, each of which includes an H-shaped core, and a coil mounted on this core.

The core includes two magnetic pole portions, and a narrow coiled portion formed between these two magnetic pole portions and having the coil wound therearound.

The two aforementioned magnetic pole portions are formed such that they are axisymmetric with respect to a symmetry axis passing through the center of the narrow coiled portion and perpendicularly intersecting the two magnetic pole portions. The core is formed to have an H shape which is symmetric with respect to the aforementioned symmetry axis.

CITATION LIST

Patent Document

PTD 1: Japanese Patent Laying-Open No. 2011-50127

SUMMARY OF INVENTION

Technical Problem

Generally, when electric power is transferred between a power reception unit and a power transmission unit, the temperature of a coil of the power reception unit and the temperature of a coil of the power transmission unit increase.

Thus, a power reception device including such a power reception unit needs to include a cooling device that cools the power reception unit. Likewise, a power transmission device including such a power transmission unit needs to include a cooling device that cools the power transmission unit.

Consequently, one problem with conventional power reception device and power transmission device has been that the devices themselves tend to increase in size.

The present invention has been made in view of the problem as described above, and a first object of the present invention is to provide a power reception device in which a power reception unit can be cooled well while a size increase of the device is suppressed. A second object of the present invention is to provide a power transmission device in which a power transmission unit can be cooled well while a size increase of the device is suppressed.

Solution to Problem

A power reception device according to the present invention receives electric power in a non-contact manner from a power transmission unit including a first coil. The power reception device includes a case having an accommodation portion formed therein, a core disposed in the case, a second coil disposed in the case and provided on the core, an electrical device disposed in the case and connected to the second coil, an insulation member disposed between an inner surface of the case and the second coil, and between the inner surface of the case and the electrical device, and a cooling device that causes a flow of a coolant to cool the second coil and the electrical device.

The second coil and the electrical device are attached to the inner surface of the case with the insulation member interposed therebetween. The electrical device is disposed upstream in a flow direction of the coolant from the second coil.

Preferably, the electrical device includes a capacitor connected to the second coil, and a rectifier that rectifies a current received by the second coil. The rectifier is disposed upstream in the flow direction of the coolant from the capacitor. The capacitor is disposed upstream in the flow direction of the coolant from the second coil.

Preferably, the electrical device includes a capacitor connected to the second coil, and a rectifier that rectifies a current received by the second coil. The capacitor is disposed upstream in the flow direction of the coolant from the rectifier. The rectifier is disposed upstream in the flow direction of the coolant from the second coil.

Preferably, the second coil is formed to surround a first winding axis. The core includes a first stem portion having the second coil wound therearound, a first magnetic pole portion formed at a first end portion of the first stem portion and extending in a first intersecting direction that intersects a direction in which the first winding axis extends, and a second magnetic pole portion formed at a second end portion of the first stem portion and extending in the first intersecting direction. A width of the first stem portion in the first intersecting direction is smaller than a length of the first magnetic pole portion and a length of the second magnetic pole portion in the first intersecting direction. A first central portion positioned at a center of the first magnetic pole portion in the first intersecting direction and a second central portion positioned at a center of the second magnetic pole portion in the first intersecting direction are displaced in the first intersecting direction from a third central portion positioned at a center of the first stem portion in the first intersecting direction. The electrical device is disposed so as to be displaced from the first stem portion in the first intersecting direction, and is disposed between the first magnetic pole portion and the second magnetic pole portion. Preferably, the cooling device supplies the coolant into the case.

Preferably, the second coil is formed to surround a first winding axis. The cooling device supplies the coolant in a first intersecting direction that intersects a direction in which the first winding axis extends. Preferably, the case is sealed.

Preferably, the second coil and a capacitor connected to the second coil form a power reception unit that receives electric power in a non-contact manner from the power transmission unit. A difference between a natural frequency of the power transmission unit and a natural frequency of the power reception unit is 10% or less of the natural frequency of the power reception unit.

Preferably, the second coil and a capacitor connected to the second coil form a power reception unit that receives electric power in a non-contact manner from the power transmission unit. A coupling coefficient between the power reception unit and the power transmission unit is 0.1 or less.

Preferably, the second coil and a capacitor connected to the second coil form a power reception unit that receives electric power in a non-contact manner from the power transmission unit. The power reception unit receives electric power from the power transmission unit through at least one of a magnetic field and an electric field, the magnetic field being formed between the power reception unit and the power transmission unit and oscillating at a specific frequency, the electric field being formed between the power reception unit and the power transmission unit and oscillating at the specific frequency.

A power transmission device according to the present invention transmits electric power in a non-contact manner to a power reception unit including a first coil. The power transmission device includes a case having an accommodation portion formed externally, a core disposed in the case, a first coil disposed in the case and provided on the core, an electrical device disposed in the case and connected to the first coil, an insulation member disposed between an inner surface of the case and the first coil, and between the inner surface of the case and the electrical device, and a cooling device that causes a flow of a coolant to cool the first coil and the electrical device.

The first coil and the electrical device are attached to the inner surface of the case with the insulation member interposed therebetween. The electrical device is disposed upstream in a flow direction of the coolant from the first coil.

Preferably, the electrical device includes a capacitor connected to the first coil.

Preferably, the first coil is formed to surround a second winding axis. The core includes a second stem portion having the first coil wound therearound, a third magnetic pole portion formed at a third end portion of the second stem portion and extending in a second intersecting direction that intersects a direction in which the second winding axis extends, and a fourth magnetic pole portion formed at a fourth end portion of the second stem portion and extending in the second intersecting direction. A width of the second stem portion in the second intersecting direction is smaller than a length of the third magnetic pole portion and a length of the fourth magnetic pole portion in the second intersecting direction. A fourth central portion positioned at a center of the third magnetic pole portion in the second intersecting direction and a fifth central portion positioned at a center of the fourth magnetic pole portion in the second intersecting direction are displaced in the second intersecting direction from a sixth central portion positioned at a center of the second stem portion in the second intersecting direction. The second electrical device is disposed so as to be displaced from the second stem portion in the second intersecting direction, and is disposed between the third magnetic pole portion and the fourth magnetic pole portion.

Preferably, the cooling device supplies the coolant into the case.

Preferably, the first coil is formed to surround a second winding axis. The cooling device supplies the coolant in a second intersecting direction that intersects a direction in which the second winding axis extends. Preferably, the case is sealed.

Preferably, the first coil and a capacitor connected to the first coil form a power transmission unit that transmits electric power in a non-contact manner to the power reception unit. A difference between a natural frequency of the power transmission unit and a natural frequency of the power reception unit is 10% or less of the natural frequency of the power reception unit.

Preferably, the first coil and a capacitor connected to the first coil form a power transmission unit that transmits electric power in a non-contact manner to the power reception unit. A coupling coefficient between the power reception unit and the power transmission unit is 0.1 or less.

Preferably, the first coil and a capacitor connected to the first coil form a power transmission unit that transmits electric power in a non-contact manner to the power reception unit. The power transmission unit transmits electric power to the power reception unit through at least one of a magnetic field and an electric field, the magnetic field being formed between the power reception unit and the power transmission unit and oscillating at a specific frequency, the electric field being formed between the power reception unit and the power transmission unit and oscillating at the specific frequency.

Advantageous Effects of Invention

According to the power reception device of the present invention, the power reception unit can be cooled well while a size increase of the device is suppressed. According to the power transmission unit of the present invention, the power transmission unit can be cooled well while a size increase of the device is suppressed.

DESCRIPTION OF EMBODIMENTS

Figure 1:
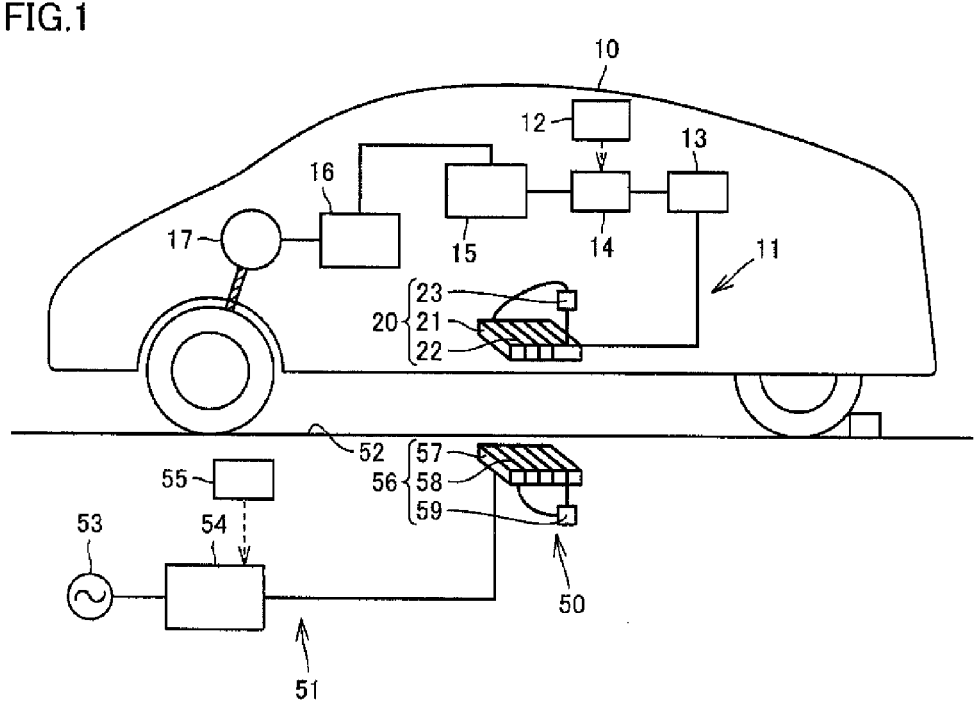
FIG. 1 is a schematic diagram schematically showing a power reception device, a power transmission device, and a power transfer system according to the present embodiment.

FIG. 1 is a schematic diagram schematically showing a power reception device, a power transmission device, and a power transfer system according to the present embodiment.

The power transfer system according to the first embodiment includes an electrically powered vehicle 10 including a power reception device 11, and an external power feeding device 51 including a power transmission device 50. Power reception device 11 of electrically powered vehicle 10 receives electric power mainly from power transmission device 50 when parked in a predetermined position of a parking space 52 provided with power transmission device 50.

Parking space 52 is provided with a sprag as well as lines indicating a parking position and a parking range such that electrically powered vehicle 10 is parked at the predetermined position.

External power feeding device 51 includes a high-frequency power driver 54 connected to an AC power supply 53, a control unit 55 that controls driving of high-frequency power driver 54 or the like, and power transmission device 50 connected to this high-frequency power driver 54. Power transmission device 50 includes a power transmission unit 56. Power transmission unit 56 includes a ferrite core 57, a first coil 58 wound around ferrite core 57, and a capacitor 59 connected to this first coil 58. It is noted that capacitor 59 is not an essential configuration. First coil 58 is connected to high-frequency power driver 54.

Power transmission unit 56 includes an electric circuit formed by inductance of first coil 58, stray capacitance of first coil 58, and capacitance of capacitor 59.

In FIG. 1, electrically powered vehicle 10 includes power reception device 11, a rectifier 13 connected to power reception device 11, a DCDC converter 14 connected to rectifier 13, a battery 15 connected to DCDC converter 14, a power control unit (PCU) 16, a motor unit 17 connected to power control unit 16, and a vehicle ECU (Electronic Control Unit) 12 that controls driving of DCDC converter 14, power control unit 16, or the like. It is noted that electrically powered vehicle 10 according to the present embodiment is a hybrid vehicle including an engine not shown in the figures, but includes a fuel cell vehicle as long as it is a vehicle driven by a motor.

Rectifier 13, which is connected to power reception device 11, converts alternating current supplied from power reception device 11 into direct current, and supplies it to DCDC converter 14.

DCDC converter 14 adjusts the voltage of the direct current supplied from rectifier 13, and supplies it to battery 15. It is noted that DCDC converter 14 is not an essential configuration and may be omitted. In such a case, DCDC converter 14 can be replaced with a matching device provided between power transmission device 50 and high-frequency power driver 54 to match the impedance with external power feeding device 51.

Power control unit 16 includes a converter connected to battery 15 and an inverter connected to this converter, and the converter adjusts (boosts) the direct current supplied from battery 15 and supplies it to the inverter. The inverter converts the direct current supplied from the converter into alternating current, and supplies it to motor unit 17.

For motor unit 17, a three-phase alternating current motor or the like is employed, for example. Motor unit 17 is driven using the alternating current supplied from the inverter of power control unit 16.

It is noted that electrically powered vehicle 10 further includes an engine or a fuel cell. Motor unit 17 includes a motor generator that mainly functions as a power generator, and a motor generator that mainly functions as a motor.

Power reception device 11 includes a power reception unit 20. Power reception unit 20 includes a ferrite core 21, a second coil 22 wound around the outer circumferential surface of ferrite core 21, and a capacitor 23 connected to second coil 22. Also in power reception unit 20, capacitor 23 is not an essential configuration. Second coil 22 is connected to rectifier 13. Second coil 22 has stray capacitance. Accordingly, power reception unit 20 has an electric circuit formed by inductance of second coil 22 and capacitances of second coil 22 and capacitor 23. It is noted that capacitor 23 is not an essential configuration and can be omitted.

Figure 2:
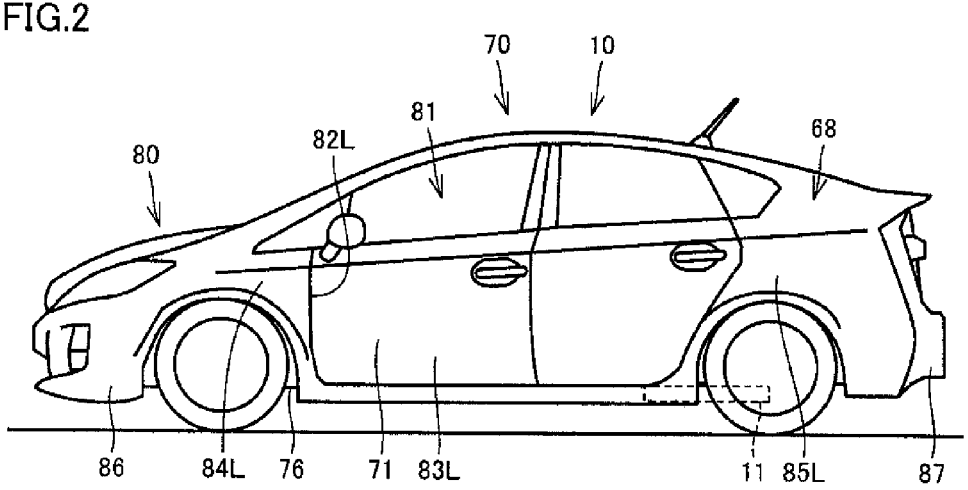
FIG. 2 is a side view showing the left side surface of an electrically powered vehicle 10.
Figure 3:
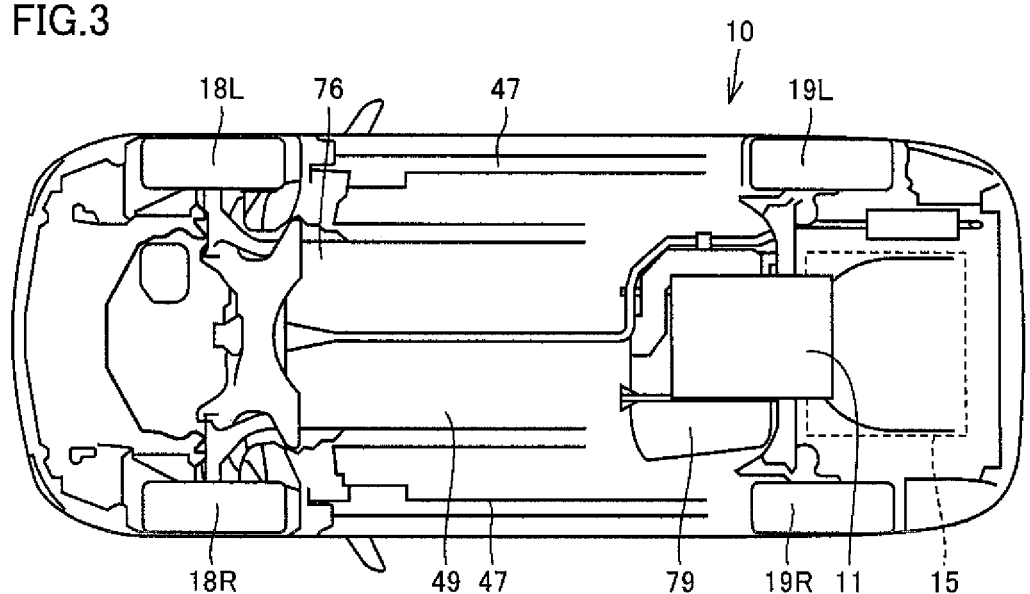
FIG. 3 is a bottom view of electrically powered vehicle 10.

FIG. 2 is a side view showing the left side surface of electrically powered vehicle 10. FIG. 3 is a bottom view of electrically powered vehicle 10.

In FIG. 2, electrically powered vehicle 10 includes a vehicle main body 70 and wheels provided in vehicle main body 70. Formed in vehicle main body 70 are a driving compartment 80 having motor unit 17, the engine, and the like contained therein, a passenger compartment 81 capable of containing a passenger therein and disposed at a rear side relative to driving compartment 80 in the traveling direction of electrically powered vehicle 10, and a luggage compartment 68 disposed at a rear side relative to passenger compartment 81 in the traveling direction.

In left side surface 71 of electrically powered vehicle 10, a boarding opening 82L is formed to communicate with passenger compartment 81. Vehicle main body 70 includes a door 83L that opens/closes boarding opening 82L, a front fender 84L disposed at a front side relative to boarding opening 82L in the traveling direction, and a front bumper 86 disposed at a front side relative to front fender 84 in the traveling direction.

Vehicle main body 70 includes a rear fender 85L disposed at a rear side relative to boarding opening 82L in the traveling direction, and a rear bumper 87 disposed at a rear side relative to rear fender 85L in the travelling direction.

In FIG. 3, bottom surface 76 of electrically powered vehicle 10 is a surface that can be seen when electrically powered vehicle 10 is viewed from a position away downwardly in the direction vertical to the ground in a state such that the wheels (tires) of electrically powered vehicle 10 are in contact with the ground. As shown in this FIG. 3, electrically powered vehicle 10 includes a front wheel 18R and a front wheel 18L that are arranged in the width direction of the vehicle, and a rear wheel 19R and a rear wheel 19L that are arranged in the width direction of the vehicle. It is noted that front wheels 18R and 18L are disposed at the front side of the vehicle relative to rear wheels 19R and 19L. Power reception unit 20 is disposed between rear wheels 19R and 19L.

Electrically powered vehicle 10 includes a floor panel 49 separating the inside of the vehicle from the outside of the vehicle, side members 47 disposed on a lower surface of floor panel 49, and cross members disposed on the lower surface of floor panel 49.

Figure 4:
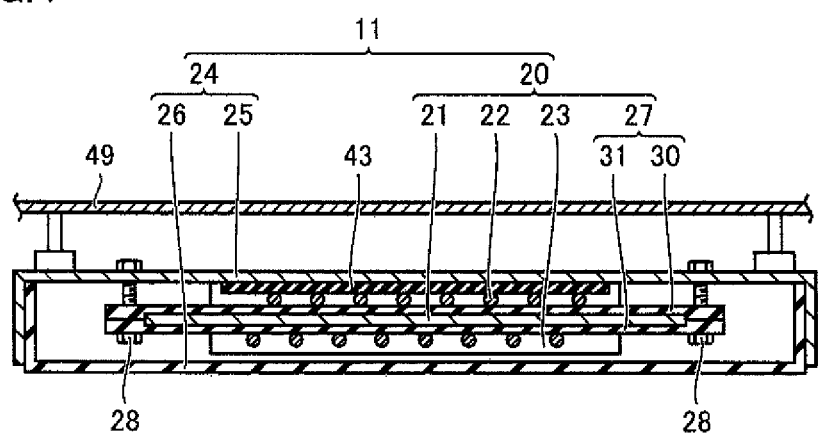
FIG. 4 is a cross-sectional view showing a power reception device 11.
Figure 5:
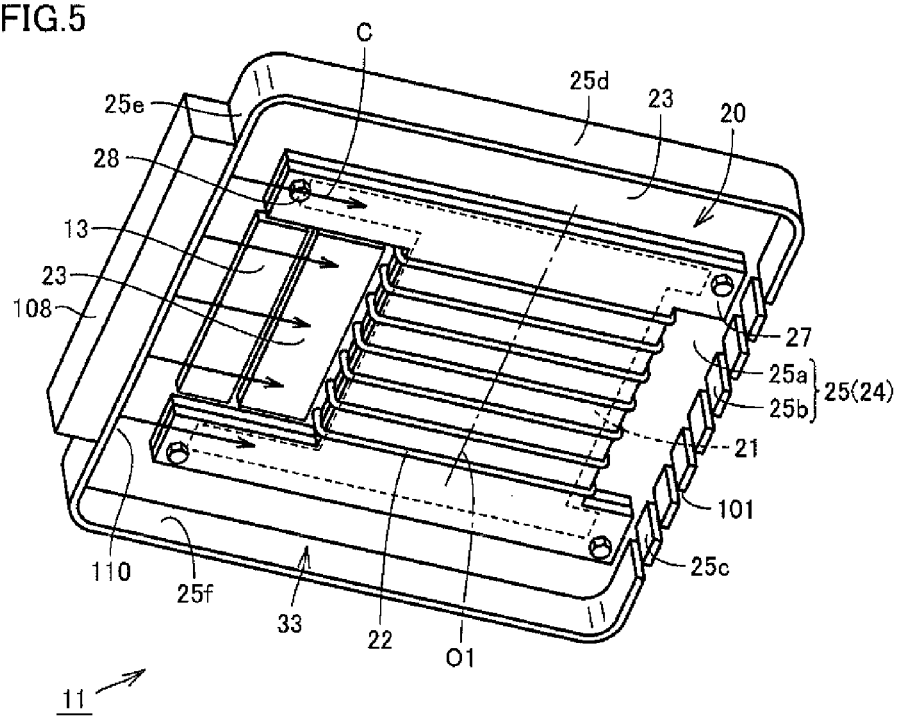
FIG. 5 is an exploded perspective view of power reception device 11.
Figure 5:
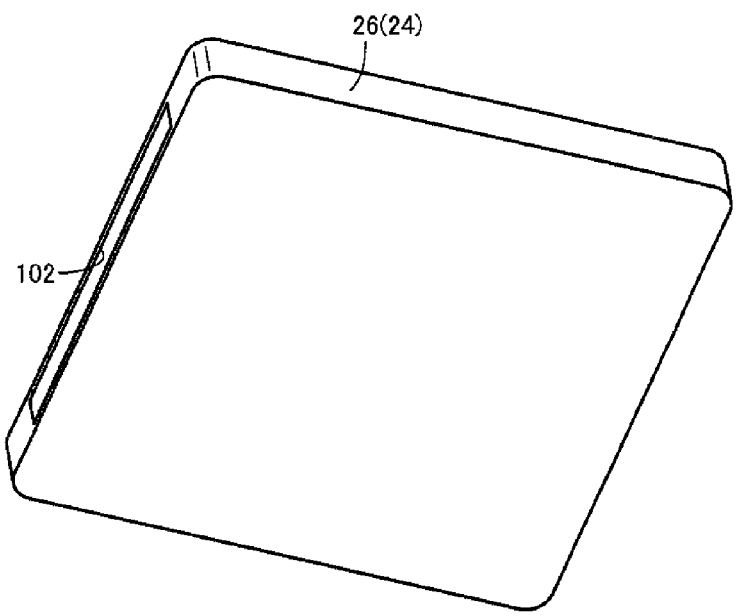

FIG. 4 is a cross-sectional view showing power reception device 11, and FIG. 5 is an exploded perspective view of power reception device 11. As shown in FIGS. 4 and 5, power reception device 11 includes power reception unit 20, rectifier 13 connected to power reception unit 20, a case 24 having power reception unit 20 and rectifier 13 contained therein, and a cooling device 108.

Case 24 includes a shield 25 formed to open downwardly, and a cover portion 26 provided to close the opening of shield 25. Shield 25 and cover portion 26 cooperate with each other to form an accommodation compartment accommodating power reception unit 20 and rectifier 13.

Shield 25 includes a top plate portion 25a, and a circumferential wall portion 25b formed to extend downwardly from the circumferential edge portion of top plate portion 25a. Circumferential wall portion 25b includes a plurality of wall portions 25c to 25f, and the plurality of wall portions 25c to 25f are connected to one another to form annular circumferential wall portion 25b. Wall portion 25c and wall portion 25e are arranged in a direction in which a winding axis O1 of second coil 22 extends, whereas wall portion 25d and wall portion 25f are arranged in a direction perpendicular to winding axis O1 of second coil 22. It is noted that the shape of shield 25 is not limited to such a shape and various types of shapes can be employed such as a polygonal shape, a circular shape, and an oval shape.

The bottom end portion of circumferential wall portion 25b forms an opening, which is closed by cover portion 26. Cooling device 108 is provided on the outer circumferential surface of wall portion 25e. Cooling device 108 supplies cooling air C1 as a coolant into case 24. It is noted that wall portion 25e is provided with an opening through which cooling air C1 enters, and cover portion 26 is also provided with an opening 102 through which cooling air C1 enters. Circumferential wall portion 25c of shield 25 is provided with openings 101 through which cooling air C1 flows out, and cover portion 26 is also provided with openings through which cooling air C1 flows out.

Power reception unit 20 includes ferrite core 21 formed to have a plate-like shape, a fixation member 27 that sandwiches ferrite core 21 from the upper and lower sides, second coil 22 wound around fixation member 27, and capacitor 23 connected to second coil 22.

Figure 6:
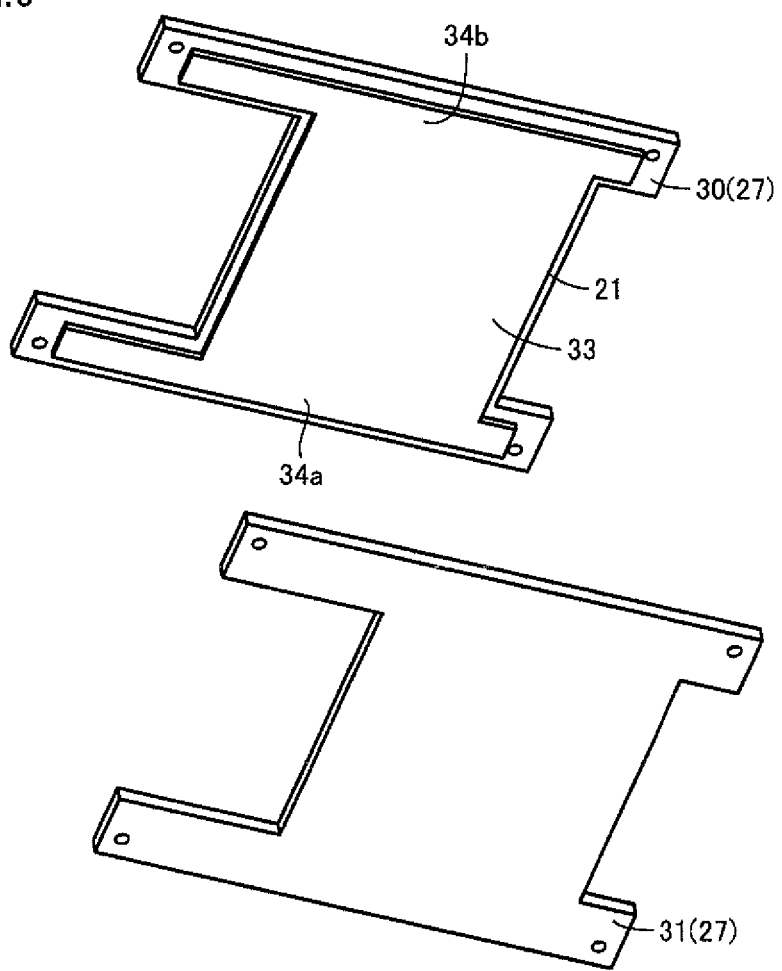
FIG. 6 is an exploded perspective view schematically showing a fixation member 27 and a ferrite core 21.
Figure 7:
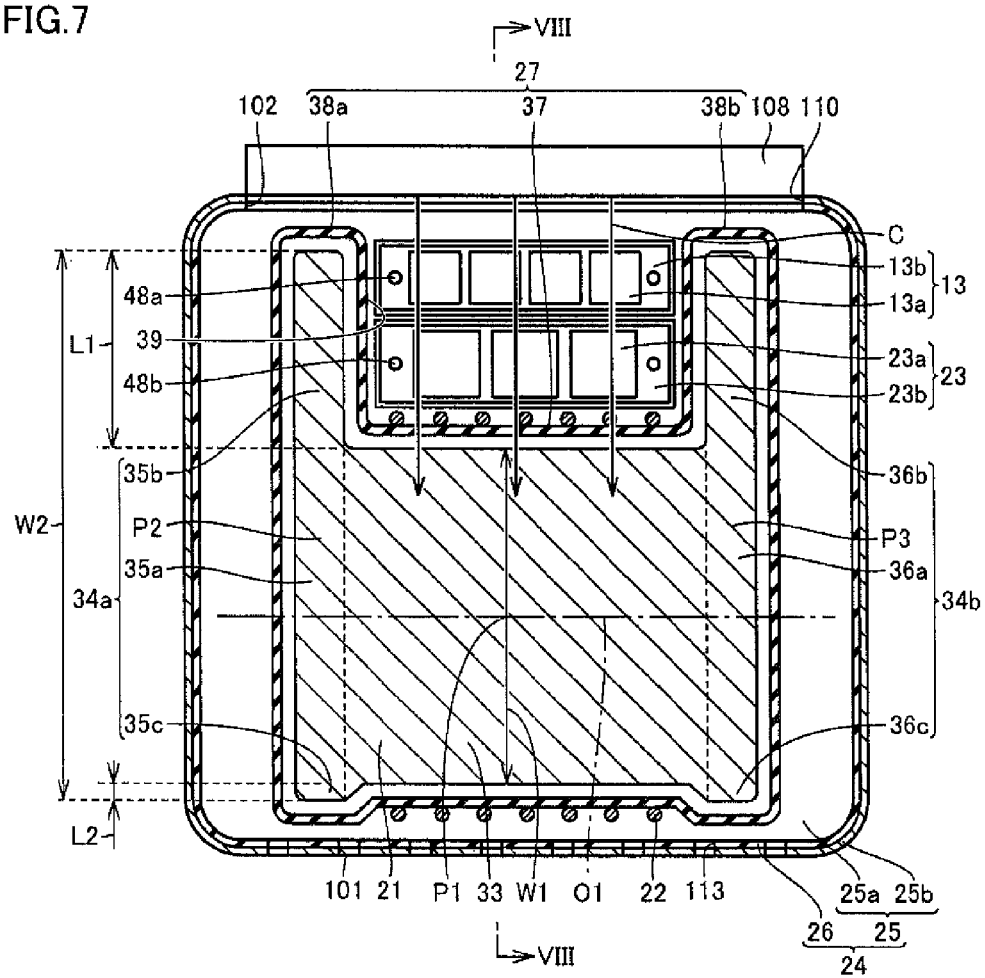
FIG. 7 is a plan cross-sectional view of power reception device 11.

FIG. 6 is an exploded perspective view schematically showing fixation member 27 and ferrite core 21. Ferrite core 21 is disposed in fixation member 27. FIG. 7 is a plan cross-sectional view of power reception device 11. As shown in FIGS. 6 and 7, ferrite core 21 is contained in fixation member 27. Ferrite core 21 is formed to have a plate-like shape, and includes a lower surface as a first main surface and an upper surface as a second main surface. Ferrite core 21 includes a stem portion 33 having second coil 22 wound therearound, a magnetic pole portion 34a formed at one end portion of stem portion 33, and a magnetic pole portion 34b formed at the other end portion of stem portion 33.

Assuming that the width of stem portion 33 in the direction perpendicular to winding axis O1 is defined as a width W1 and the width of magnetic pole portion 34a and magnetic pole portion 34b in the direction perpendicular to winding axis O1 is defined as a width W2, width W2 is greater than width W1.

Magnetic pole portion 34a includes an extending portion 35a formed to extend from an end portion of stem portion 33 in the direction in which winding axis O1 extends, a projecting portion 35b projecting from one end of extending portion 35a, and a projecting portion 35c formed to project from the other end of extending portion 35a.

The width of extending portion 35a in the direction perpendicular to winding axis O1 is the same as width W1 of stem portion 33. Projecting portion 35b projects from extending portion 35a in a direction that intersects winding axis O1. In the example shown in FIG. 7, projecting portion 35b projects from the end portion of extending portion 35a in the direction perpendicular to winding axis O1. Projecting portion 35c is formed across extending portion 35a from projecting portion 35b, and projects from extending portion 35a in the direction that intersects winding axis O1. Assuming that the projection length of projecting portion 35b from stem portion 33 (extending portion 35a) is defined as a length L1 and the projection length of projecting portion 35c from stem portion 33 (extending portion 35a) is defined as a length L2, length L1 is greater than length L2. Magnetic pole portion 34b is formed in the same way as magnetic pole portion 34a.

Magnetic pole portion 34b includes an extending portion 36a formed to extend from an end portion of stem portion 33 in the direction in which winding axis O1 extends, a projecting portion 36b projecting from one end of extending portion 36a, and a projecting portion 36c projecting from the other end of extending portion 36a.

The width of extending portion 36a in the direction perpendicular to winding axis O1 is the same as width W1 of stem portion 33. Projecting portion 36b projects from extending portion 36a in the direction that intersects winding axis O1. In the example shown in FIG. 7, projecting portion 36b projects in a direction orthogonal to winding axis O1. Projecting portion 36c projects from the end portion of extending portion 36a in the direction orthogonal to winding axis O1. The projection length of projecting portion 36b from stem portion 33 (extending portion 36a) is greater than the projection length of projecting portion 36c from stem portion 33 (extending portion 36a).

Projecting portion 35b and projecting portion 36b face each other with a space therebetween in the direction in which winding axis O1 extends, and projecting portion 35c and projecting portion 36c face each other with a space therebetween in the direction in which winding axis O1 extends. Assume that a central portion of stem portion 33 in the direction orthogonal to winding axis O1 is defined as a central portion P1. Assume that a central portion of magnetic pole portion 34a in the direction orthogonal to winding axis O1 is defined as a central portion P2, and a central portion of magnetic pole portion 34b in the direction orthogonal to winding axis O1 is defined as a central portion P3. Central portion P2 and central portion P3 are displaced from central portion P1 in the direction orthogonal to winding axis O1. In the present embodiment, central portion P2 and central portion P3 are positioned closer to cooling device 108 than central portion P1.

As shown in FIG. 6, fixation member 27 includes an insulation piece 30 disposed at the upper surface side of ferrite core 21, and an insulation piece 31 disposed at the lower surface side of ferrite core 21. As shown in FIGS. 4 and 5, insulation piece 30 and insulation piece 31 are integrated with each other by a fixation member 28 such as a bolt, and fixed to top plate portion 25a of shield 25.

In FIG. 7, fixation member 27 includes a narrow portion 37 covering stem portion 33 of ferrite core 21, a wide portion 38a formed at one end portion of narrow portion 37 to cover magnetic pole portion 34a, and a wide portion 38b formed at the other end portion of narrow portion 37 to cover magnetic pole portion 34b. Narrow portion 37 is formed, as with stem portion 33, to have a plate-like shape.

Narrow portion 37, wide portion 38a, and wide portion 38b form a recess 39.

Second coil 22 is wound around ferrite core 21 with fixation member 27 interposed therebetween, and second coil 22 is formed to surround winding axis O1 by winding a coil wire. As second coil 22 extends from one end portion to the other end portion, second coil 22 is formed to be displaced in the direction in which winding axis O1 extends. Second coil 22 is wound around the outer circumferential surface of narrow portion 37. A portion of second coil 22 located at the lower surface side of narrow portion 37 extends in the direction that intersects the direction in which winding axis O1 extends.

Rectifier 13 and capacitor 23 are disposed in recess 39. Thus, dead space can be reduced and the size of power reception unit 20 can be reduced. The electronic devices such as rectifier 13 and capacitor 23 are positioned closer to cooling device 108 than second coil 22. Specifically, capacitor 23 is disposed so as to be closer to cooling device 108 than second coil 22. Rectifier 13 is disposed so as to be closer to cooling device 108 than capacitor 23.

Rectifier 13 includes a substrate 13b and a plurality of elements 13a mounted on substrate 13b. Elements 13a are, for example, electronic elements such as diodes. Capacitor 23 also includes a substrate 23b and a plurality of elements 23a mounted on substrate 23b. Elements 23a are, for example, ceramic capacitors.

Figure 8:
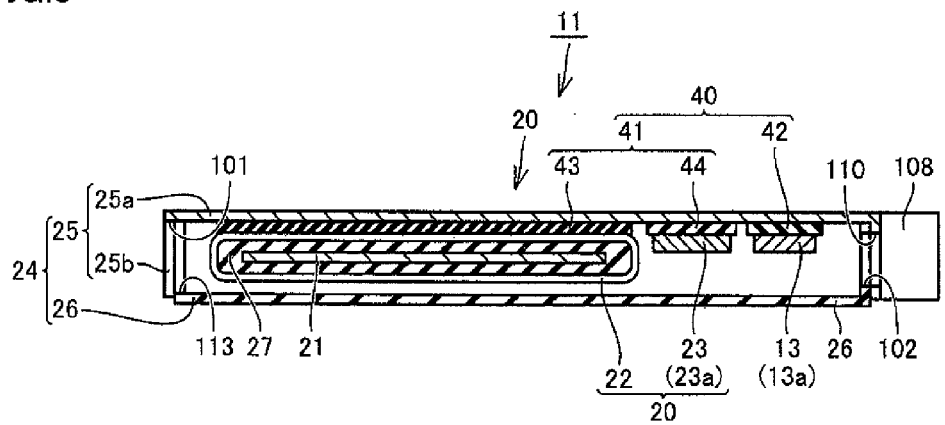
FIG. 8 is a cross-sectional view taken along line VIII-VIII in FIG. 7.
Figure 9:
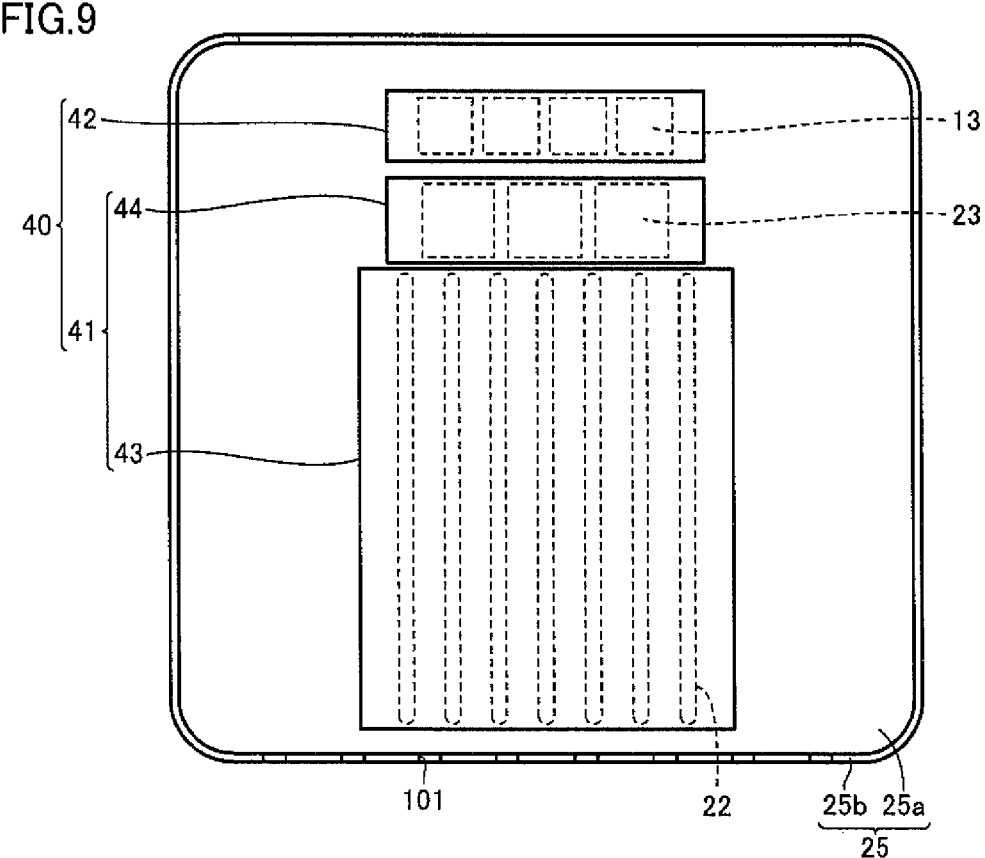
FIG. 9 is a plan view showing a shield 25 and an insulation member 40.

FIG. 8 is a cross-sectional view taken along line VIII-VIII in FIG. 7. FIG. 9 is a plan view showing shield 25 and an insulation member 40. As shown in FIGS. 8 and 9, power reception device 11 includes insulation member 40 provided directly on the inner surface of top plate portion 25a.

Insulation member 40 includes an insulation member for power reception unit 41 provided between power reception unit 20 and the inner surface of shield 25, and an insulation member for device 42 provided between rectifier 13 and the inner surface of shield 25.

Insulation member for power reception unit 41 is provided between second coil 22, capacitor 23, and shield 25, and ensures electrical insulation between second coil 22 and shield 25.

Insulation member for power reception unit 41 includes an insulation member for coil 43 and an insulation member for capacitor 44. Insulation member for coil 43 is disposed between second coil 22 and shield 25, and insulation member for capacitor 44 is disposed between capacitor 23 and shield 25.

Insulation member for coil 43 and insulation member for capacitor 44 are provided directly on top plate portion 25a. Insulation member for coil 43 ensures electrical insulation between second coil 22 and shield 25, and insulation member for capacitor 44 ensures electrical insulation between capacitor 23 and shield 25.

Insulation member for device 42 is also provided directly on top plate portion 25a, and insulation member for device 42a ensures electrical insulation between rectifier 13 and top plate portion 25a. Each of insulation member for device 42, insulation member for coil 43, and insulation member for capacitor 44 is formed to have a plate-like shape.

Figure 10:
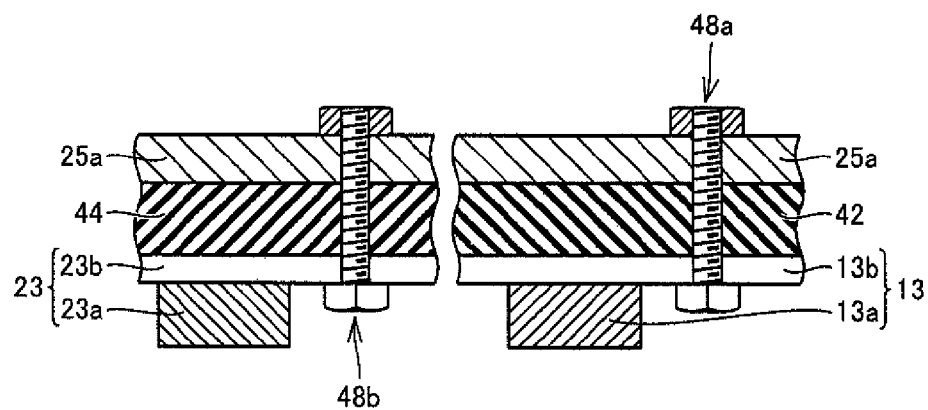
FIG. 10 is a cross-sectional view showing a structure around a rectifier 13 and a capacitor 23.

FIG. 10 is a cross-sectional view showing a structure around rectifier 13 and capacitor 23. As shown in FIG. 10, capacitor 23 includes substrate 23b and element 23a mounted on a main surface of substrate 23b. Rectifier 13 includes substrate 13b and element 13a mounted on a main surface of substrate 13b.

Insulation member for capacitor 44 and capacitor 23 are fixed to top plate portion 25a by a fixation member 48b such as a bolt. Likewise, rectifier 13 and insulation member for capacitor 44 are fixed to top plate portion 25a by a fixation member 48a. In this way, each of capacitor 23 and rectifier 13 is fixed to the shield with the insulation member interposed therebetween.

In this manner, rectifier 13 is in surface contact with top plate portion 25a with insulation member for device 42 interposed therebetween, and capacitor 23 is fixed to top plate portion 25a with insulation member for capacitor 44 interposed therebetween.

In FIG. 4, second coil 22 is wound around the circumferential surface of fixation member 27, and second coil 22 is pressed against insulation member for coil 43 by fixation member 28. It is noted that fixation member 27 having second coil 22 wound therearound is fixed to shield 25 by fixation member 28. In this way, second coil 22 is in surface contact with the inner surface of shield 25 with insulation member for coil 43 interposed therebetween.

Although the example shown in FIG. 8 or the like above describes fixing power reception unit 20, rectifier 13 and capacitor 23 with insulation member 40 being in contact with top plate portion 25a in order to attach them to the shield, another member may be disposed between insulation member 40 and top plate portion 25a.

Figure 11:
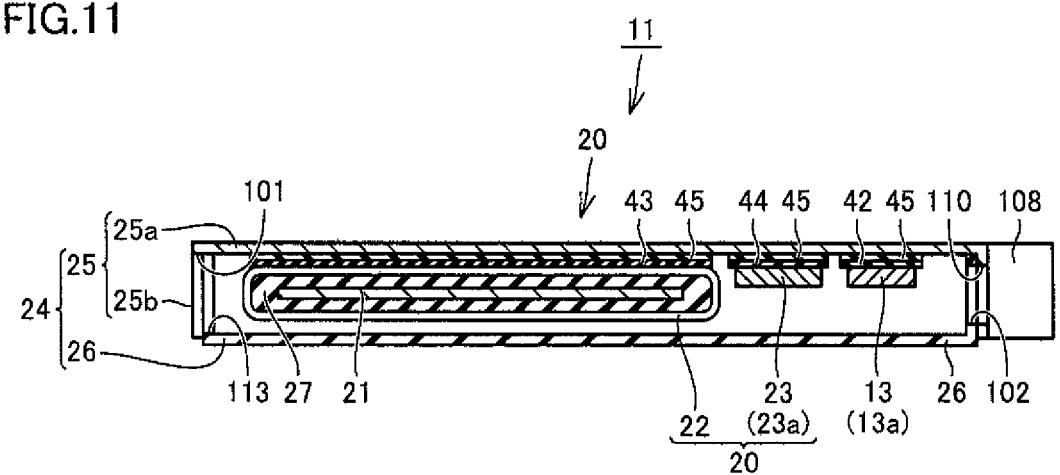
FIG. 11 is a cross-sectional view showing a modification of the manner in which insulation member 40 and the like are fixed.
Figure 12:
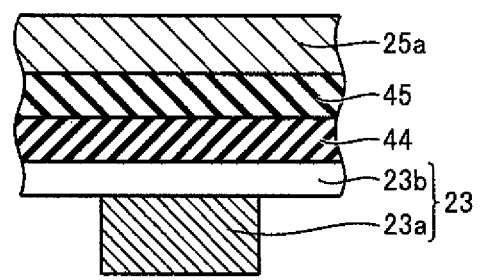
FIG. 12 is a cross-sectional view showing a structure of an element 23a shown in FIG. 11 and therearound.

FIG. 11 is a cross-sectional view showing a modification of the manner in which insulation member 40 and the like are fixed. In the example shown in FIG. 11, a thermally conductive member 45 is disposed between insulation member 40 and top plate portion 25a. FIG. 12 is a cross-sectional view showing a structure of element 23a shown in FIG. 11 and therearound. As shown in FIG. 12, thermally conductive member 45 is disposed between insulation member for capacitor 44 and top plate portion 25a.

Thermally conductive member 45 is made of, for example, an insulating material of low hardness, and has viscosity. For example, thermally conductive low hardness acrylic can be employed as thermally conductive member 45. Thermally conductive member 45 bond insulation member for capacitor 44 and top plate portion 25a to each other.

It is noted that thermally conductive member 45 is one example of members disposed between insulation member 40 and top plate portion 25a, and other insulating materials and conductive materials may be disposed.

Power reception device 11 thus formed is provided at the bottom surface 76 side of electrically powered vehicle 10 as shown in FIG. 4. Various types of methods can be employed to fix power reception device 11. For example, power reception device 11 may be suspended from side members 47 and the cross members. Alternatively, power reception device 11 may be fixed to floor panel 49. An under cover may be provided at the lower side relative to power reception device 11.

In this manner, regarding the expression "power reception device 11 is disposed at the bottom surface 76 side," power reception device 11 does not need to be necessarily provided at a position that can be visually seen when electrically powered vehicle 10 is viewed from below electrically powered vehicle 10. Hence, for example, power reception device 11 is disposed at the lower side relative to floor panel 49.

Figure 13:
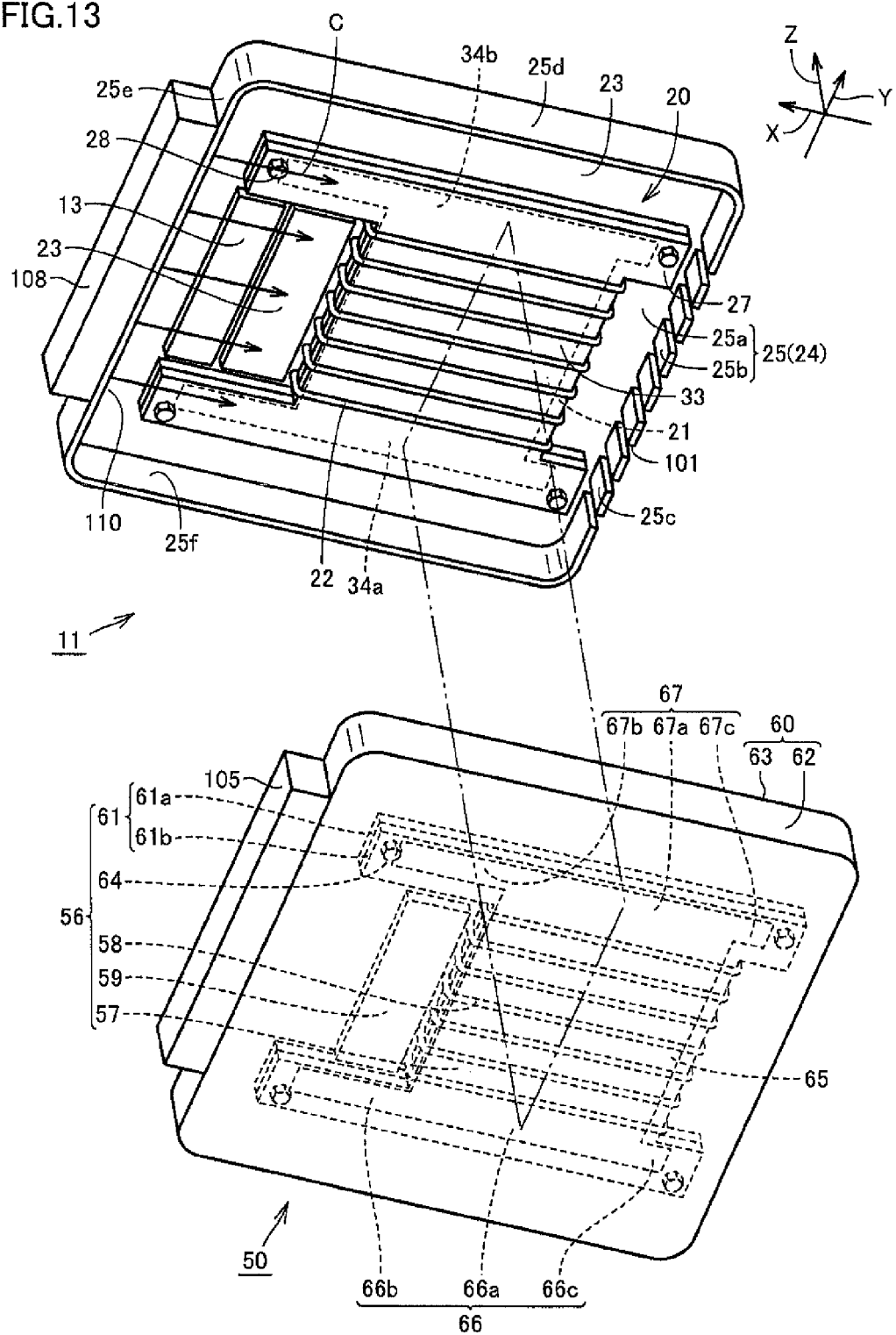
FIG. 13 is a perspective view showing a state in which a power reception unit 20 and a power transmission unit 56 are arranged to face each other.

FIG. 13 is a perspective view showing a state in which power reception unit 20 and power transmission unit 56 are arranged to face each other. It is noted that cover portion 26 provided in power reception device 11 is not shown in FIG. 13.

As shown in FIG. 13, during electric power transfer, power reception unit 20 and power transmission unit 56 are arranged to face each other with an air gap therebetween.

Power transmission device 50 includes power transmission unit 56, a case 60 having power transmission unit 56 contained therein, and a cooling device 105.

Case 60 includes a shield 62 made of a metal material such as copper, and a cover member 63 made of a resin and provided on shield 62.

Figure 14:
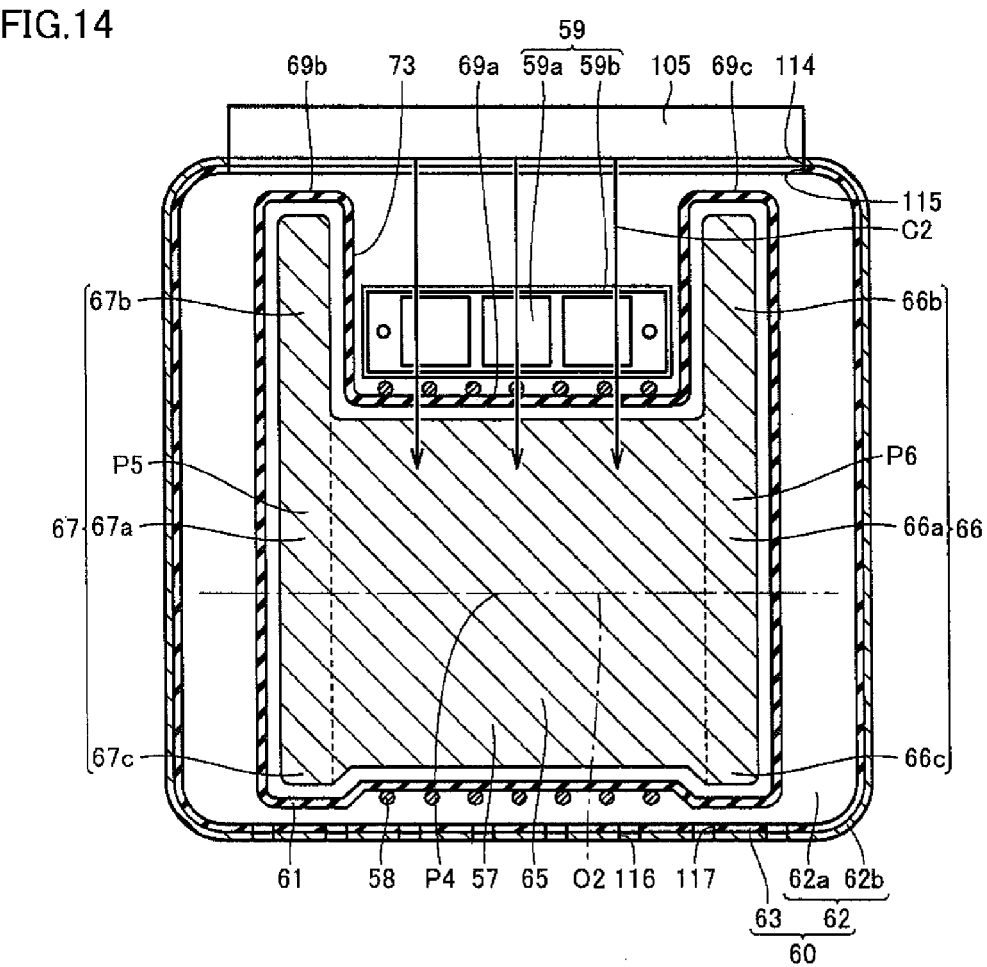
FIG. 14 is a cross-sectional view of a power transmission device 50 shown in FIG. 13.

FIG. 14 is a cross-sectional view of power transmission device 50 shown in FIG. 13. As shown in FIGS. 14 and 13, shield 62 includes a bottom surface portion 62a, and a circumferential wall portion 62b formed to have an annular shape rising upwardly from the outer circumferential edge of bottom surface portion 62a. Circumferential wall portion 62b has an upper end portion extending in an annular manner to provide an opening that opens upwardly. Circumferential wall portion 62b includes a wall portion provided with an opening 114, and a wall portion provided with a plurality of openings 116. Capacitor 59 and second coil 22 are positioned between the wall portion provided with opening 114 and the wall portion provided with openings 116. Cover member 63 is formed to close the opening formed by the upper end portion of the circumferential wall portion of shield 62. Cover member 63 is provided with an opening 115 that communicates with opening 114, and openings 117 that communicate with openings 116.

Cover member 63 and shield 62 cooperate with each other to form an accommodation compartment accommodating power transmission unit 56. Cooling device 105 is provided on the outer circumferential surface of circumferential wall portion 62b provided with opening 114. Cooling air C2 from cooling device 105 enters case 60 through openings 114 and 115, and is exhausted to the outside of case 60 through openings 116 and 117.

Power transmission unit 56 includes a fixation member 61 contained in case 60, ferrite core 57 contained in fixation member 61, first coil 58 attached onto the outer circumferential surface of fixation member 61, and capacitor 59 contained in case 60. First coil 58 is wound around fixation member 61. Capacitor 59 is disposed so as to be closer to cooling device 105 than first coil 58. Ferrite core 57 is contained in fixation member 61. As shown in FIG. 13, fixation member 61 includes an insulation piece 61a disposed at the upper surface side of ferrite core 57, and an insulation piece 61b disposed at the lower surface side of ferrite core 57.

In FIG. 14, first coil 58 is formed to surround a winding axis O2. As first coil 58 extends from one end to the other end, first coil 58 is formed to be displaced in a direction in which winding axis O2 extends. Ferrite core 57 is formed to have a plate-like shape. Ferrite core 57 includes a stem portion 65 having first coil 58 wound therearound, a magnetic pole portion 66 formed at one end of stem portion 65, and a magnetic pole portion 67 formed at the other end of stem portion 65.

The width of stem portion 65 in a direction perpendicular to winding axis O2 is smaller than the width of magnetic pole portion 67 in the direction perpendicular to winding axis O2 and the width of magnetic pole portion 66 in the direction perpendicular to winding axis O2.

Magnetic pole portion 67 includes an extending portion 67a projecting continuously from stem portion 65 in the direction in which winding axis O2 extends, a projecting portion 67b projecting from one end portion of extending portion 67a in a direction that intersects (e.g., the direction perpendicular to) winding axis O2, and a projecting portion 67c projecting from the other end portion of extending portion 67a in the direction that intersects (e.g., the direction perpendicular to) winding axis O2.

A projecting portion 66b and projecting portion 67b face each other in the direction in which winding axis O2 extends, and a projecting portion 66c and projecting portion 67c face each other in the direction in which winding axis O2 extends.

The width of extending portion 67a in the direction perpendicular to winding axis O2 is substantially the same as the width of stem portion 65 in the direction perpendicular to winding axis O2.

The projection length of projecting portion 67b from extending portion 67a or stem portion 65 is greater than the projection length of projecting portion 67c from extending portion 67a or stem portion 65.

The width of an extending portion 66a in the direction perpendicular to winding axis O2 is substantially the same as the width of stem portion 65 in the direction perpendicular to winding axis O2.

The projection length of projecting portion 66b from extending portion 66a or stem portion 65 is greater than the projection length of projecting portion 66c from extending portion 66a or stem portion 65. Assume that a central portion of stem portion 33 in a direction orthogonal to winding axis O2 is defined as a central portion P4. Assume that a central portion of magnetic pole portion 67 in the direction orthogonal to winding axis O2 is defined as a central portion P5, and a central portion of magnetic pole portion 66 in the direction orthogonal to winding axis O2 is defined as a central portion P6. Central portion P5 and central portion P6 are displaced from central portion P4 in the direction orthogonal to winding axis O2. In the present embodiment, central portion P5 and central portion P6 are positioned closer to cooling device 105 than central portion P4.

In FIG. 13, fixation member 61 includes an insulation piece 61a disposed at the upper surface side of ferrite core 57, and an insulation piece 61b disposed at the lower surface side of ferrite core 57.

Since ferrite core 57 is sandwiched between insulation piece 61a and insulation piece 61b, ferrite core 57 is protected.

In FIG. 14, fixation member 61 includes a narrow portion 69a covering stem portion 65, a wide portion 69b covering magnetic pole portion 67, and a wide portion 69c covering magnetic pole portion 66.

Wide portion 69b is formed at one end portion of narrow portion 69a, and projects in the direction that intersects winding axis O2. Wide portion 69c is formed at the other end portion, and projects in the direction that intersects winding axis O2.

Narrow portion 69a, wide portion 69b, and wide portion 69c form a recess 73. Capacitor 59 is disposed in recess 73. Thus, dead space can be reduced and the size of power transmission device 50 can be reduced.

Capacitor 59 includes a substrate 59b fixed to bottom surface portion 62a, and elements 59a mounted on a main surface of substrate 59b.

Figure 15:
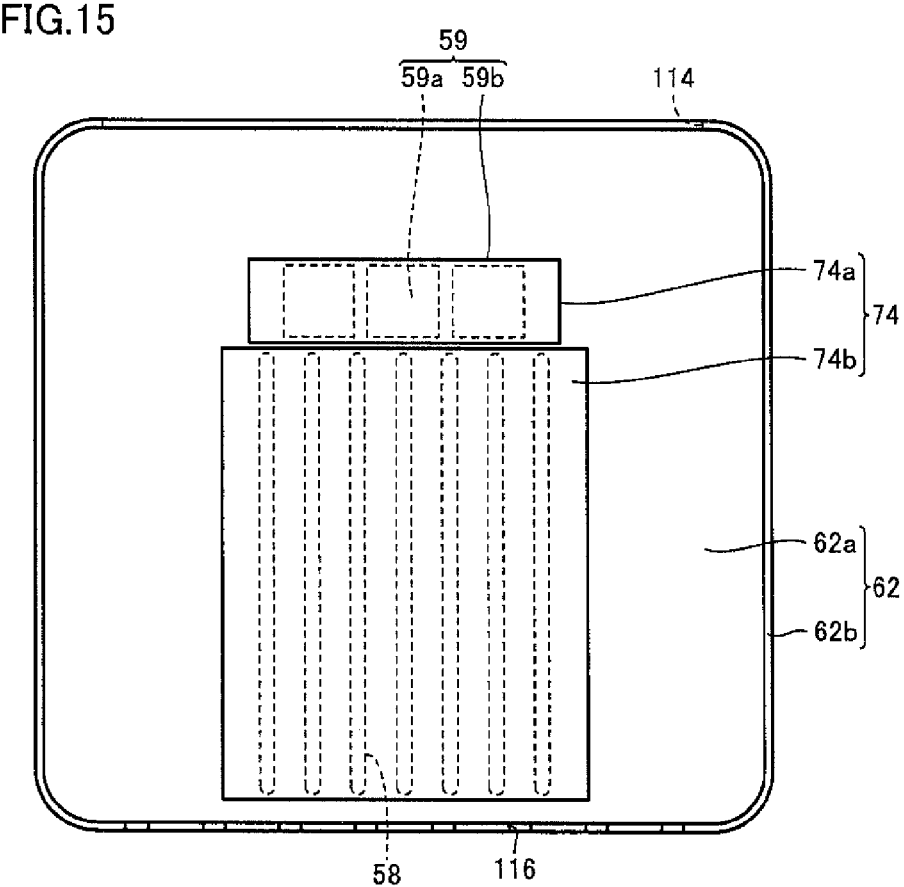
FIG. 15 is a plan view showing a shield 62 in a state where devices such as power reception unit 20 and the like have been removed.

FIG. 15 is a plan view showing shield 62 in a state where devices such as power reception unit 20 and the like have been removed. As shown in FIG. 15, an insulation member 74 includes an insulation member 74a and an insulation member 74b. Insulation member 74a ensures insulation between capacitor 59 and bottom surface portion 62a. Insulation member 74b ensures insulation between first coil 58 and bottom surface portion 62a.

It is noted that power transmission unit 56 is fixed to bottom surface portion 62a by a fixation member such as a bolt. Since power transmission unit 56 is fixed to bottom surface portion 62a, first coil 58 is pressed against insulation member 74b. Thus, capacitor 59 is in surface contact with bottom surface portion 62a with insulation member 74a interposed therebetween. First coil 58 is in surface contact with bottom surface portion 62a with insulation member 74b interposed therebetween.

In FIG. 1, in the power transfer system according to the present embodiment, a difference between the natural frequency of power transmission unit 56 and the natural frequency of power reception unit 20 is 10% or less of the natural frequency of power reception unit 20 or power transmission unit 56. By setting the natural frequency of each of power transmission unit 56 and power reception unit 20 to fall within such a range, power transfer efficiency can be improved. Meanwhile, if the difference in natural frequency becomes larger than 10% of the natural frequency of power reception unit 20 or power transmission unit 56, the power transfer efficiency becomes less than 10%, which results in problems such as a long charging time for battery 15.

Here, when no capacitor 59 is provided, the expression "natural frequency of power transmission unit 56" is intended to mean an oscillation frequency at which the electric circuit formed by the inductance of first coil 58 and the capacitance of first coil 58 freely oscillates. When capacitor 59 is provided, the expression "natural frequency of power transmission unit 56" is intended to mean an oscillation frequency at which the electric circuit formed by the capacitances of first coil 58 and capacitor 59 and the inductance of first coil 58 freely oscillates. In the above-described electric circuit, the natural frequency when the damping force and the electric resistance are set at zero or substantially zero is also called "resonance frequency of power transmission unit 56."

Likewise, when no capacitor 23 is provided, the expression "natural frequency of power reception unit 20" is intended to mean an oscillation frequency at which the electric circuit formed by the inductance of second coil 22 and the capacitance of second coil 22 freely oscillates. When capacitor 23 is provided, the expression "natural frequency of power reception unit 20" is intended to mean an oscillation frequency at which the electric circuit formed by the capacitances of second coil 22 and capacitor 23 and the inductance of second coil 22 freely oscillates. In the above-described electric circuit, the natural frequency when the damping force and the electric resistance are set at zero or substantially zero is also called "resonance frequency of power reception unit 20."

Figure 16:
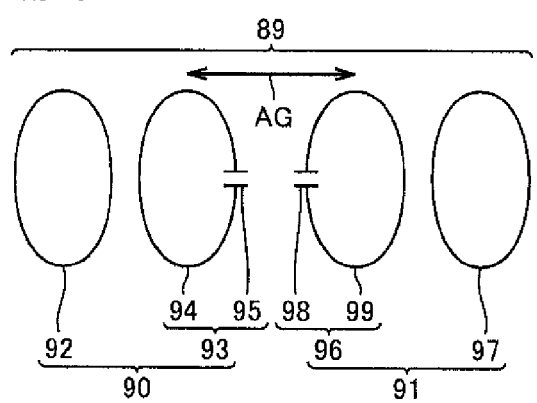
FIG. 16 is a schematic diagram showing a simulation model of the power transfer system.
Figure 17:
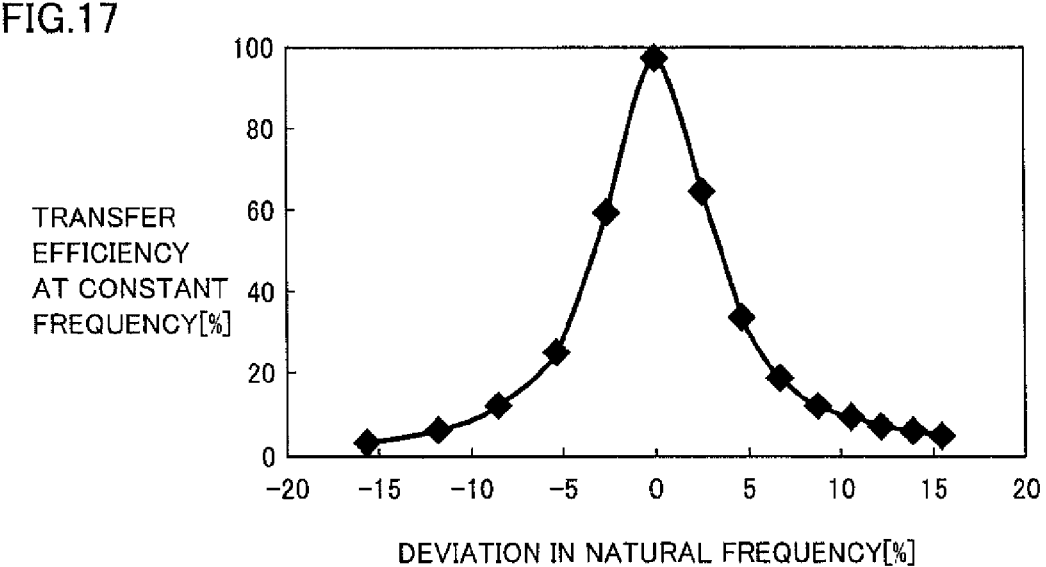
FIG. 17 is a graph showing relation between deviation (%) in natural frequency and transfer efficiency (%).

With reference to FIGS. 16 and 17, the following describes a result of simulation in which relation is analyzed between the difference in natural frequency and the power transfer efficiency. FIG. 16 shows a simulation model of the power transfer system. The power transfer system includes a power transmission device 90 and a power reception device 91. Power transmission device 90 includes a coil 92 (electromagnetic induction coil) and a power transmission unit 93. Power transmission unit 93 includes a coil 94 (resonance coil) and a capacitor 95 provided in coil 94.

Power reception device 91 includes a power reception unit 96 and a coil 97 (electromagnetic induction coil). Power reception unit 96 includes a coil 99 and a capacitor 98 connected to coil 99 (resonance coil).

Assume that the inductance of coil 94 is inductance Lt and the capacitance of capacitor 95 is capacitance C1. Assume that the inductance of coil 99 is inductance Lr and the capacitance of capacitor 98 is capacitance C2. By setting each of the parameters in this way, natural frequency f1 of power transmission unit 93 is indicated by the following formula (1) and natural frequency f2 of power reception unit 96 is indicated by the following formula (2):

$$f1 = 1/\{2\pi(Lt \times C1)^{1/2}\} \tag{1}$$

$$f2 = 1/\{2\pi(Lr \times C2)^{1/2}\} \tag{2}$$

Here, FIG. 16 shows relation between the power transfer efficiency and the deviation in natural frequency between power transmission unit 93 and power reception unit 96 when only inductance Lt is changed with inductance Lr and capacitances C1, C2 being fixed. In this simulation, a relative positional relation between coil 94 and coil 99 is fixed, and the frequency of current supplied to power transmission unit 93 is constant.

In the graph shown in FIG. 17, the horizontal axis represents the deviation (%) in natural frequency whereas the vertical axis represents the transfer efficiency (%) at the constant frequency. The deviation (%) in natural frequency is indicated by the following formula (3):

$$\text{(Deviation in natural frequency)} = \{(f1-f2)/f2\} \times 100(\%) \tag{3}$$

As apparent also from FIG. 17, when the deviation (%) in natural frequency is ±0%, the power transfer efficiency is close to 100%. When the deviation (%) in natural frequency is ±5%, the power transfer efficiency is 40%. When the deviation (%) in natural frequency is ±10%, the power transfer efficiency is 10%. When the deviation (%) in natural frequency is ±15%, the power transfer efficiency is 5%. Thus, it is understood that the power transfer efficiency can be improved by setting the natural frequency of each of the power transmission unit and the power reception unit such that the absolute value (difference in natural frequency) of the deviation (%) in natural frequency falls within a range of 10% or less of the natural frequency of power reception unit 96. Further, it is understood that the power transfer efficiency can be more improved by setting the natural frequency of each of the power transmission unit and the power reception unit such that the absolute value of the deviation (%) in natural frequency falls within a range of 5% or less of the natural frequency of power reception unit 96. It is noted that electromagnetic field analysis software (JMAG® provided by JSOL Corporation) is employed as simulation software.

The following describes an operation of the power transfer system according to the present embodiment.

In FIG. 1, first coil 58 is supplied with AC power from high-frequency power driver 54. On this occasion, the electric power is supplied such that the alternating current flowing through first coil 58 has a specific frequency.

When the current having the specific frequency flows through first coil 58, an electromagnetic field, which oscillates at the specific frequency, is formed around first coil 58.

Second coil 22 is disposed in a predetermined range from first coil 58 and receives electric power from the electromagnetic field formed around first coil 58.

In the present embodiment, helical coils are employed for second coil 22 and first coil 58. Accordingly, a magnetic field and an electric field, which oscillate at the specific frequency, are formed around first coil 58 and second coil 22 receives electric power mainly from the magnetic field.

Here, the following describes the magnetic field formed around first coil 58 and having the specific frequency. The "magnetic field having the specific frequency" is typically relevant to the power transfer efficiency and the frequency of current supplied to first coil 58. First described is relation between the power transfer efficiency and the frequency of current supplied to first coil 58. The power transfer efficiency when transferring electric power from first coil 58 to second coil 22 is changed depending on various factors such as a distance between first coil 58 and second coil 22. For example, the natural frequencies (resonance frequencies) of power transmission unit 56 and power reception unit 20 are assumed as natural frequency ID, the frequency of current supplied to first coil 58 is assumed as frequency f3, and the air gap between second coil 22 and first coil 58 is assumed as air gap AG.

Figure 18:
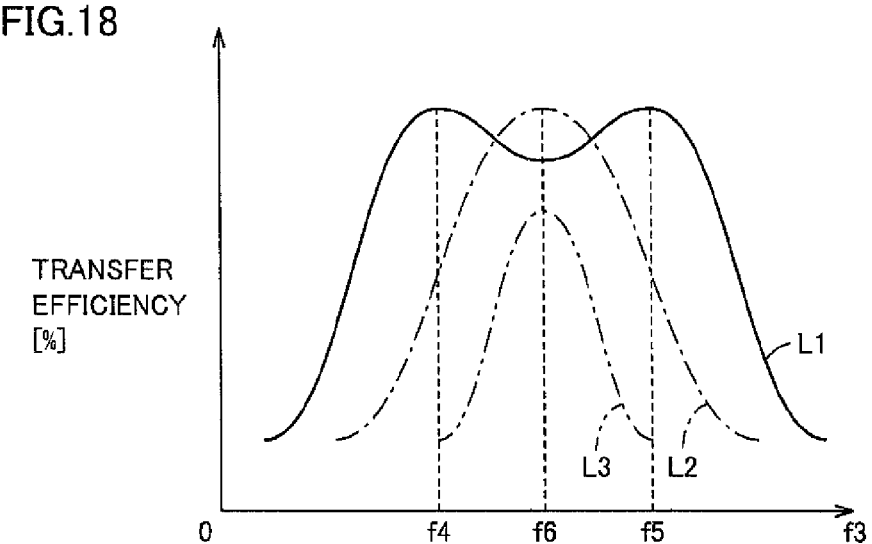
FIG. 18 is a graph showing relation between the power transfer efficiency when an air gap AG is changed with natural frequency f0 being fixed and frequency f3 of current supplied to a first coil 58.

FIG. 18 is a graph indicating relation between the power transfer efficiency when air gap AG is changed with natural frequency f0 being fixed and frequency f3 of current supplied to first coil 58.

In the graph shown in FIG. 18, the horizontal axis represents frequency f3 of the current supplied to first coil 58 whereas the vertical axis represents the power transfer efficiency (%). An efficiency curve L1 schematically represents relation between the power transfer efficiency when air gap AG is small and frequency f3 of the current supplied to first coil 58. As indicated by efficiency curve L1, when air gap AG is small, peaks of the power transfer efficiency appear at frequencies f4, f5 (f4<f5). When air gap AG is made larger, the two peaks at which the power transfer efficiency becomes high are changed to come closer to each other. Then, as indicated by an efficiency curve L2, when air gap AG is made larger than a predetermined distance, one peak of the power transfer efficiency appears. The peak of the power transfer efficiency appears when the current supplied to first coil 58 has a frequency f6. When air gap AG is made further larger from the state of efficiency curve L2, the peak of the power transfer efficiency becomes smaller as indicated by an efficiency curve L3.

For example, as a technique of improving the power transfer efficiency, the following first technique can be considered. The first technique is to change a characteristic of the power transfer efficiency between power transmission unit 56 and power reception unit 20 by changing the capacitances of capacitor 59 and capacitor 23 in accordance with air gap AG with the frequency of the current supplied to first coil 58 shown in FIG. 1 being constant. Specifically, with the frequency of the current supplied to first coil 58 being constant, the capacitances of capacitor 59 and capacitor 23 are adjusted to attain a peak of the power transfer efficiency. In this technique, irrespective of the size of air gap AG, the frequency of the current flowing through first coil 58 and second coil 22 is constant. It is noted that as the technique of changing the characteristic of the power transfer efficiency, the following techniques can be also employed: a technique of using a matching device provided between power transmission device 50 and high-frequency power driver 54; and a technique of using converter 14.

Meanwhile, a second technique is a technique of adjusting, based on the size of air gap AG, the frequency of the current supplied to first coil 58. For example, in FIG. 17, when the power transfer characteristic corresponds to efficiency curve L1, first coil 58 is supplied with current having frequency f4 or frequency f5. On the other hand, when the frequency characteristic corresponds to efficiency curve L2 or L3, first coil 58 is supplied with current having frequency f6. In this case, the frequency of the current flowing through each of first coil 58 and second coil 22 is changed in accordance with the size of air gap AG.

In the first technique, the frequency of the current flowing through first coil 58 becomes a fixed, constant frequency. In the second technique, the frequency thereof flowing through first coil 58 becomes a frequency appropriately changed according to air gap AG. With the first technique, the second technique, or the like, first coil 58 is supplied with current having a specific frequency set to attain high power transfer efficiency. Because the current having the specific frequency flows through first coil 58, a magnetic field (electromagnetic field), which oscillates at the specific frequency, is formed around first coil 58. Power reception unit 20 receives electric power from power transmission unit 56 via the magnetic field formed between power reception unit 20 and power transmission unit 56 and oscillating at the specific frequency. Therefore, "the magnetic field oscillating at the specific frequency" is not necessarily a magnetic field having a fixed frequency. It is noted that in the above-described example, the frequency of the current supplied to first coil 58 is set based on air gap AG, but the power transfer efficiency is also changed according to other factors such as a deviation in the horizontal direction between first coil 58 and second coil 22, so that the frequency of the current supplied to first coil 58 may be adjusted based on the other factors.

It is to be also noted that the example employing the helical coil as the resonance coil has been illustrated, but when an antenna such as a meander line antenna is employed as the resonance coil, an electric field having the specific frequency is formed around first coil 58 as a result of flow of the current having the specific frequency through first coil 58. Through this electric field, electric power is transferred between power transmission unit 56 and power reception unit 20.

Figure 19:
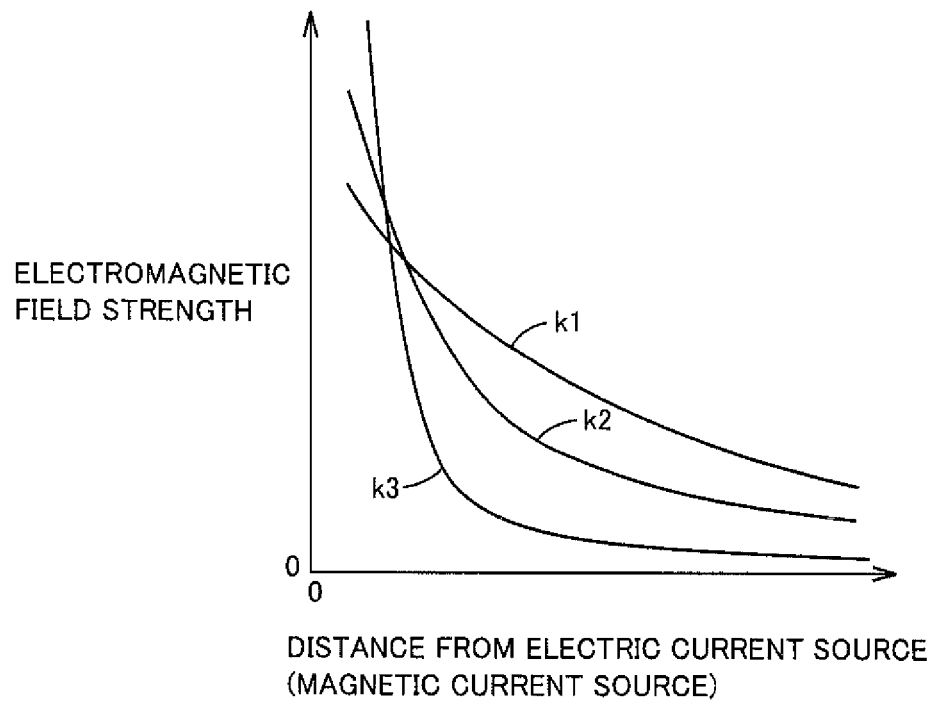
FIG. 19 is a graph showing relation between a distance from an electric current source or magnetic current source and the strength of an electromagnetic field.

In the power transfer system according to the present embodiment, efficiency in power transmission and power reception is improved by employing a near field (evanescent field) in which an "electrostatic magnetic field" of the electromagnetic field is dominant. FIG. 19 shows relation between a distance from the electric current source or magnetic current source and the strength of the electromagnetic field. Referring to FIG. 19, the electromagnetic field is constituted of three components. A curve k1 represents a component in inverse proportion to the distance from the wave source, and is referred to as "radiation electromagnetic field." A curve k2 represents a component in inverse proportion to the square of the distance from the wave source, and is referred to as "induction electromagnetic field." A curve k3 represents a component in inverse proportion to the cube of the distance from the wave source, and is referred to as "electrostatic magnetic field." Assuming that the wavelength of the electromagnetic field is represented by "λ", λ/2π represents a distance in which the strengths of the "radiation electromagnetic field," the "induction electromagnetic field," and the "electrostatic magnetic field" are substantially the same.

The "electrostatic magnetic field" is a region in which the strength of the electromagnetic wave is abruptly decreased as the distance is farther away from the wave source. In the power transfer system according to the present embodiment, the near field (evanescent field), in which this "electrostatic magnetic field" is dominant, is utilized for transfer of energy (electric power). In other words, by resonating power transmission unit 56 and power reception unit 20 (for example, a pair of LC resonant coils) having close natural frequencies in the near field in which the "electrostatic magnetic field" is dominant, the energy (electric power) is transferred from power transmission unit 56 to the other side, i.e., power reception unit 20. This "electrostatic magnetic field" does not propagate energy to a distant place. Hence, the resonance method allows for electric power transmission with less energy loss as compared with the electromagnetic wave in which the "radiation electromagnetic field" propagating energy to a distance place is utilized to transfer energy (electric power).

Thus, in this power transfer system, by resonating the power transmission unit and the power reception unit with each other through the electromagnetic field, electric power is transmitted in a non-contact manner between the power transmission unit and the power reception unit. The electromagnetic field thus formed between the power reception unit and the power transmission unit may be called, for example, "near field resonance coupling field." Further, a coupling coefficient κ between the power transmission unit and the power reception unit is about 0.3 or less, preferably, 0.1 or less, for example. Coupling coefficient κ may also fall within a range of about 0.1 to about 0.3. Coupling coefficient κ is not limited to such a value, and various values to attain excellent electric power transfer can be employed.

The coupling between power transmission unit 56 and power reception unit 20 during electric power transfer in the present embodiment is called, for example, "magnetic resonance coupling," "magnetic field resonance coupling," "magnetic field resonance coupling," "near field resonance coupling," "electromagnetic field resonance coupling," or "electric field resonance coupling."

The term "electromagnetic field resonance coupling" is intended to indicate coupling including any of the "magnetic resonance coupling," the "magnetic field resonance coupling," and the "electric field resonance coupling."

Each of first coil 58 of power transmission unit 56 and second coil 22 of power reception unit 20 as described in the present specification employs an antenna having a coil shape, so that power transmission unit 56 and power reception unit 20 are coupled to each other mainly by a magnetic field. Thus, power transmission unit 56 and power reception unit 20 are coupled to each other by means of the "magnetic resonance coupling" or the "magnetic field resonance coupling."

It is noted that an antenna such as a meander line antenna can be employed as first coil 58, 22, for example. In this case, power transmission unit 56 and power reception unit 20 are coupled to each other mainly through electric field.

On this occasion, power transmission unit 56 and power reception unit 20 are coupled to each other by means of the "electric field resonance coupling."

In FIG. 13, when transferring electric power between power reception unit 20 and power transmission unit 56, first coil 58 is supplied with alternating current having a predetermined frequency.

By supplying the predetermined alternating current to first coil 58, an electromagnetic field oscillating at a predetermined frequency is formed around first coil 58. Then, second coil 22 receives electric power from the electromagnetic field. Moreover, a magnetic path is formed between power reception unit 20 and power transmission unit 56.

The magnetic path passes through magnetic pole portion 66, stem portion 65, magnetic pole portion 67, the air gap, magnetic pole portion 34b, stem portion 33, magnetic pole portion 34a, and the air gap.

Figure 20:
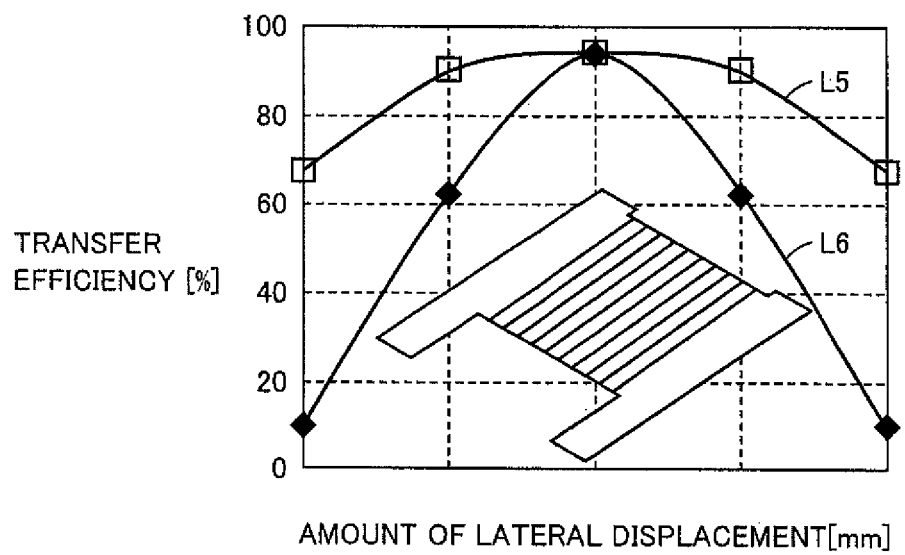
FIG. 20 is a graph showing relation between an amount of lateral displacement between power reception unit 20 and power transmission unit 56, and power transfer efficiency in FIG. 13.

FIG. 20 is a graph showing relation between an amount of lateral displacement between power reception unit 20 and power transmission unit 56 in FIG. 13, and power transfer efficiency.

Here, the direction in which winding axis O1 extends is defined as a Y-axis direction. The direction perpendicular to winding axis O1 is defined as an X-axis direction. A direction in which power reception unit 20 and power transmission unit 56 are vertically apart folly, each other is defined as a Z-axis direction.

A curve L5 represents relation between an amount of positional displacement between power reception unit 20 and power transmission unit 56 in the X-axis direction, and the power transfer efficiency. A curve L6 represents relation between an amount of positional displacement between power reception unit 20 and power transmission unit 56 in the Y-axis direction, and the power transfer efficiency.

Figure 21:
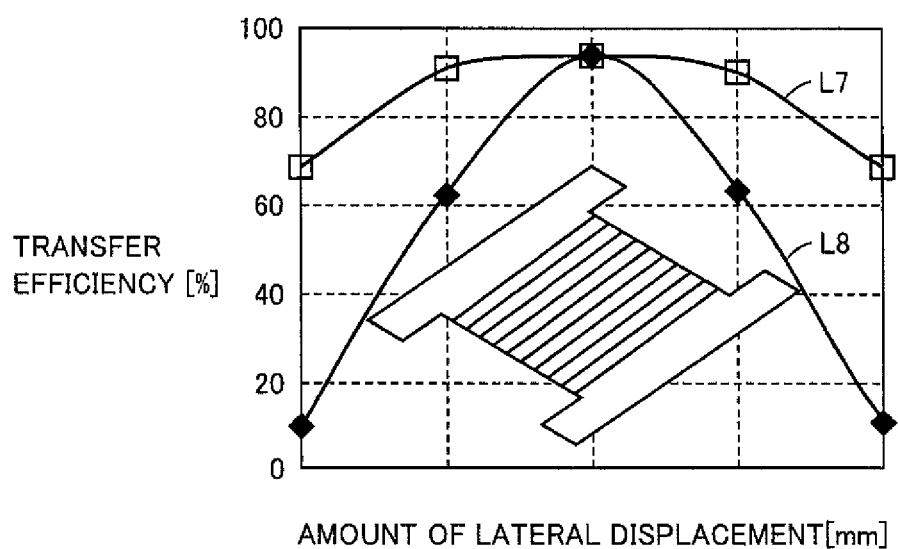
FIG. 21 is a graph showing relation between an amount of positional displacement between power reception unit 20 and power transmission unit 56, and power transfer efficiency, as a comparative example.

FIG. 21 is a graph showing relation between an amount of positional displacement between power reception unit 20 and power transmission unit 56, and power transfer efficiency, as a comparative example.

Power reception unit 20 according to the comparative example of FIG. 21 includes ferrite core 21 formed to have an H-shape. Specifically, in FIG. 7, stem portion 33 is disposed between magnetic pole portion 34a and magnetic pole portion 34b such that projection length L1 of projecting portions 35b and 36b is equal to projection length L2 of projecting portions 35c and 36c. It is noted that power transmission unit 56 also includes a ferrite core formed to have an H-shape.

In FIG. 21, a curve L7 represents relation between an amount of positional displacement in the X-axis direction and the power transfer efficiency. A curve L8 represents relation between an amount of positional displacement in the Y-axis direction and the power transfer efficiency.

As shown in FIGS. 20 and 21, a power transfer characteristic of the power transfer system according to the present embodiment is closely analogous to a power transfer characteristic of the power transfer system according to the comparative example.

This is because, with power reception unit 20 and power transmission unit 56 both including the magnetic pole portions, the magnetic path will be formed between power reception unit 20 and power transmission unit 56 even if power reception unit 20 and power transmission unit 56 are displaced in position relative to each other.

Particularly, as is also clear from FIG. 20, it can be seen that high power transfer efficiency can be maintained even if power reception unit 20 and power transmission unit 56 are displaced in position from each other in the X-axis direction.

When electric power is transferred between power reception unit 20 and power transmission unit 56 in this manner, the various devices mounted on power reception unit 20 and power transmission unit 56 generate heat.

For example, in FIG. 8, second coil 22, capacitor 23, rectifier 13 and the like generate heat. On this occasion, second coil 22 is pressed against insulation member for coil 43, which is in direct contact with top plate portion 25a. When second coil 22 generates heat, therefore, the heat of second coil 22 is mainly dissipated to shield 25 made of a metal material such as copper. Hence, increase in temperature of second coil 22 can be suppressed.

Likewise, since insulation member for capacitor 44 is directly fixed to top plate portion 25a, the heat from capacitor 23 is dissipated well to shield 25.

Rectifier 13 is fixed to insulation member for device 42, which is directly fixed to top plate portion 25a. Thus, the heat from rectifier 13 is dissipated well to shield 25.

It is noted that the heat from second coil 22 can be dissipated well to top plate portion 25a even if thermally conductive member 45 is provided between thermally conductive member 45 and top plate portion 25a as shown in FIG. 11. Likewise, the heat of capacitor 23 and rectifier 13 can be dissipated well to shield 25 even if thermally conductive member 45 is provided between insulation member for capacitor 44, insulation member for device 42, and top plate portion 25a.

By utilizing shield 25 as a heat dissipation unit in this manner, the various devices mounted on power reception unit 20 can be cooled well. In FIGS. 14 and 15, the heat from first coil 58 and capacitor 59 is dissipated well to shield 62 also in power transmission unit 56.

In FIG. 7, cooling air C1 from cooling device 108 enters case 24 through an opening 110 formed in shield 25 and opening 102 formed in cover portion 26. Cooling air C1 that has entered case 24 is exhausted to the outside through openings 113 formed in cover portion 26 and openings 112 formed in shield 25.

The flow of cooling air C1 through case 24 cools rectifier 13, capacitor 23 and second coil 22.

In power reception unit 20, the flow direction of cooling air C1 is a direction from openings 110 and 102 toward openings 112 and 113. In the present embodiment, the flow direction of cooling air C1 is the direction that intersects winding axis O1.

Since the electronic devices such as rectifier 13 and capacitor 23 are located upstream in the flow direction of cooling air C1 from second coil 22, elements 13a of rectifier 13 and elements 23a of capacitor 23 can be cooled well. Rectifier 13 is disposed upstream in the flow direction of cooling air C1 from capacitor 23. Thus, the diodes having low heat resistance can be cooled well.

Each of the direction in which the portion of second coil 22 located at the lower surface side of narrow portion 37 extends and the flow direction of cooling air C1 is the direction that intersects the direction in which winding axis O1 extends. Hence, cooling air C1 flows along the portion of second coil 22 located at the lower surface side of narrow portion 37.

Consequently, flow resistance during the flow of cooling air C1 can be reduced, thus improving cooling efficiency of cooling air C1.

In power transmission device 50 shown in FIG. 14, the cooling air from cooling device 105 enters case 60 through opening 114 and opening 115. The cooling air then cools capacitor 59 and first coil 58, and is exhausted to the outside through openings 117 and openings 116. The flow direction of cooling air C2 is the direction that intersects the direction in which winding axis O2 extends. Capacitor 59 is disposed upstream in the flow direction of cooling air C2 from first coil 58.

Thus, capacitor 59 can be cooled well. A portion of first coil 58 located at the upper surface side of ferrite core 57 extends in the direction that intersects winding axis O2, and cooling air C2 also flows in the direction that intersects winding axis O2. Thus, cooling air C2 flows along the portion of first coil 58 located at the upper surface side of ferrite core 57. Consequently, flow resistance of cooling air C2 is reduced, thus improving cooling efficiency of cooling air C2.

Figure 22:
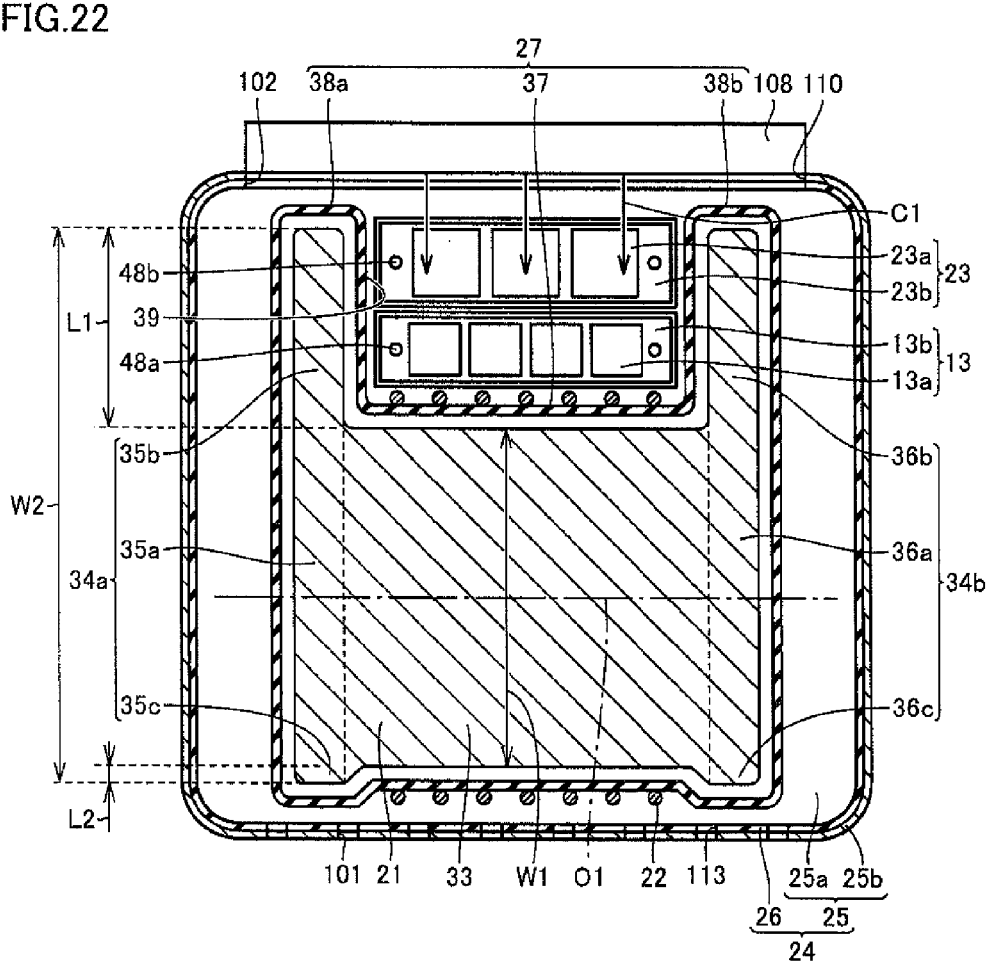
FIG. 22 is a cross-sectional view showing a modification of power reception device 11.

Referring to FIG. 22, a modification of power reception device 11 according to the first embodiment is described. FIG. 22 is a cross-sectional view showing a modification of power reception device 11. It is noted that components shown in FIG. 22 the same as or corresponding to the components shown in FIGS. 1 to 21 described above are designated by the same reference characters and description thereof is not repeated. In the example shown in FIG. 22, rectifier 13 is disposed adjacent to second coil 22, and capacitor 23 is disposed across rectifier 13 from second coil 22. Thus, rectifier 13 is disposed upstream in the flow direction of cooling air C1 from second coil 22. Capacitor 23 is disposed upstream in the flow direction of cooling air C1 from rectifier 13.

Here, the capacity of element 23a of capacitor 23 is highly temperature dependent. In the example shown in FIG. 22, therefore, capacitor 23 is disposed upstream in the flow direction of cooling air C1 from rectifier 13 to thereby suppress variation in capacity of element 23a.

Second Embodiment

Figure 23:
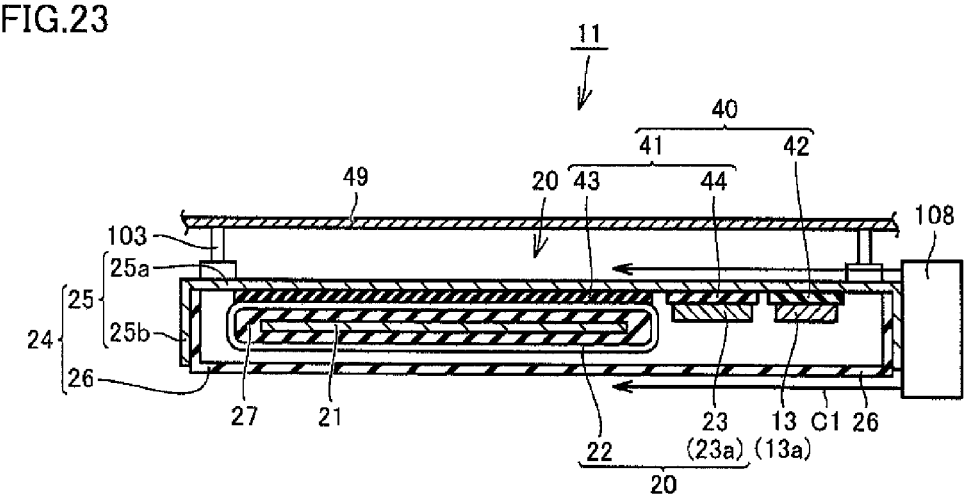
FIG. 23 is a cross-sectional view showing a structure of power reception device 11 and therearound.
Figure 24:
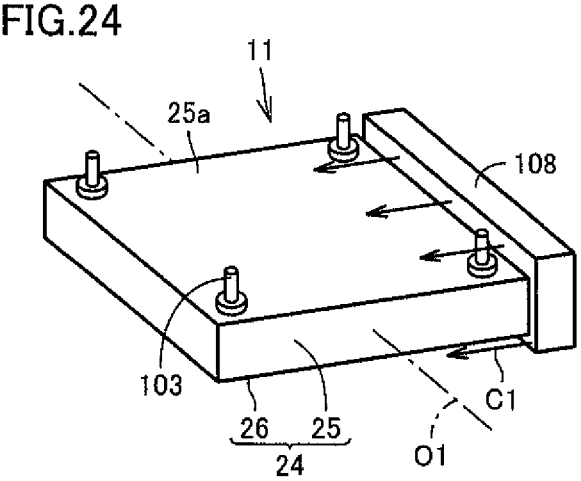
FIG. 24 is a perspective view schematically showing a structure of power reception device 11 and therearound.

Referring to FIGS. 23 and 24, power reception device 11 and power transmission device 50 according to a second embodiment are described. It is noted that description of components shown in FIGS. 23 and 24 the same as or corresponding to the components shown in FIGS. 1 to 22 described above may not be repeated.

FIG. 23 is a cross-sectional view showing a structure of power reception device 11 and therearound. FIG. 24 is a perspective view schematically showing a structure of power reception device 11 and therearound. As shown in FIGS. 23 and 24, case 24 is provided with a plurality of suspension portions 103 on its upper surface, and case 24 is suspended from the lower surface of floor panel 49. Thus, a gap is formed between the upper surface of case 24 and the lower surface of floor panel 49.

Case 24 is sealed. Cooling device 108 blows cooling air C1 on the outer surface of case 24. Thus, top plate portion 25a of shield 25 is actively cooled by cooling air C1. As with power reception device 11 according to the first embodiment describe above, also in the second embodiment, rectifier 13 and capacitor 23 are attached to top plate portion 25a, with insulation member for device 42 and insulation member for capacitor 44 being disposed between rectifier 13, capacitor 23, and top plate portion 25a.

Second coil 22 is also attached to top plate portion 25a, with insulation member for coil 43 being provided between second coil 22 and top plate portion 25a.

By blowing cooling air C1 on top plate portion 25a, therefore, rectifier 13, capacitor 23 and second coil 22 can be cooled well.

As shown in FIG. 23, also in the present embodiment, rectifier 13 is located upstream in the flow direction of cooling air C1 from capacitor 23, and capacitor 23 is located upstream in the flow direction of cooling air C1 from second coil 22. Thus, rectifier 13 can be cooled well also in the present embodiment. It is noted that capacitor 23 may be disposed upstream in the flow direction of cooling air C1 from rectifier 13. In this case, capacitor 23 can be cooled well. Case 24 is sealed to prevent entry of foreign objects such as rainwater therein from outside.

Figure 25:
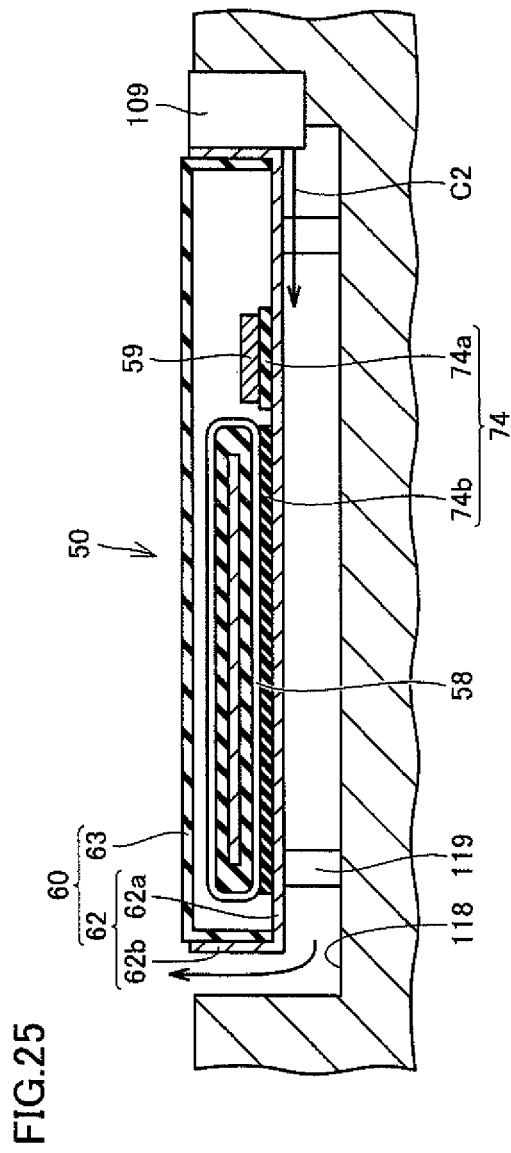
FIG. 25 is a perspective view showing a structure of power transmission device 50 and therearound.
Figure 26:
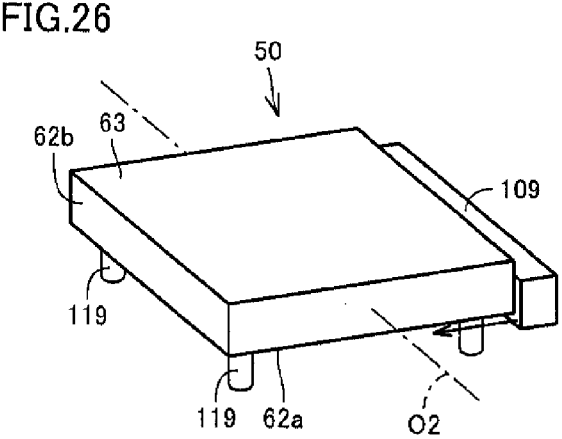
FIG. 26 is a perspective view showing a structure of power transmission device 50 and therearound.

FIG. 25 is a perspective view showing a structure of power transmission device 50 and therearound. FIG. 26 is a perspective view showing a structure of power transmission device 50 and therearound.

In FIGS. 25 and 26, case 60 is contained in a groove portion 118 formed in the ground. Bottom surface portion 62a of shield 62 is supported by a plurality of support pillars 119, with a gap being formed between bottom surface portion 62a and the inner surface of groove portion 118. A gap is also formed between circumferential wall portion 62b of shield 62 and the inner surface of groove portion 118. The gaps communicate with one another to form a flow path through which cooling air C2 flows.

Cooling air C2 from a cooling device 109 flows between bottom surface portion 62a and the inner surface of groove portion 118, and between circumferential wall portion 62b and groove portion 118, and is exhausted to the outside.

Also in the second embodiment, capacitor 59 is attached to circumferential wall portion 62b, with insulation member 74a being disposed between capacitor 59 and circumferential wall portion 62b. First coil 58 is also attached to bottom surface portion 62a, with insulation member 74b being disposed between first coil 58 and bottom surface portion 62a.

The flow of cooling air C2 thus cools bottom surface portion 62a, and capacitor 59 and first coil 58 can be cooled well.

Capacitor 59 is disposed upstream in the flow direction of cooling air C2 from first coil 58. Thus, capacitor 58 can be cooled well.

Figure 27:
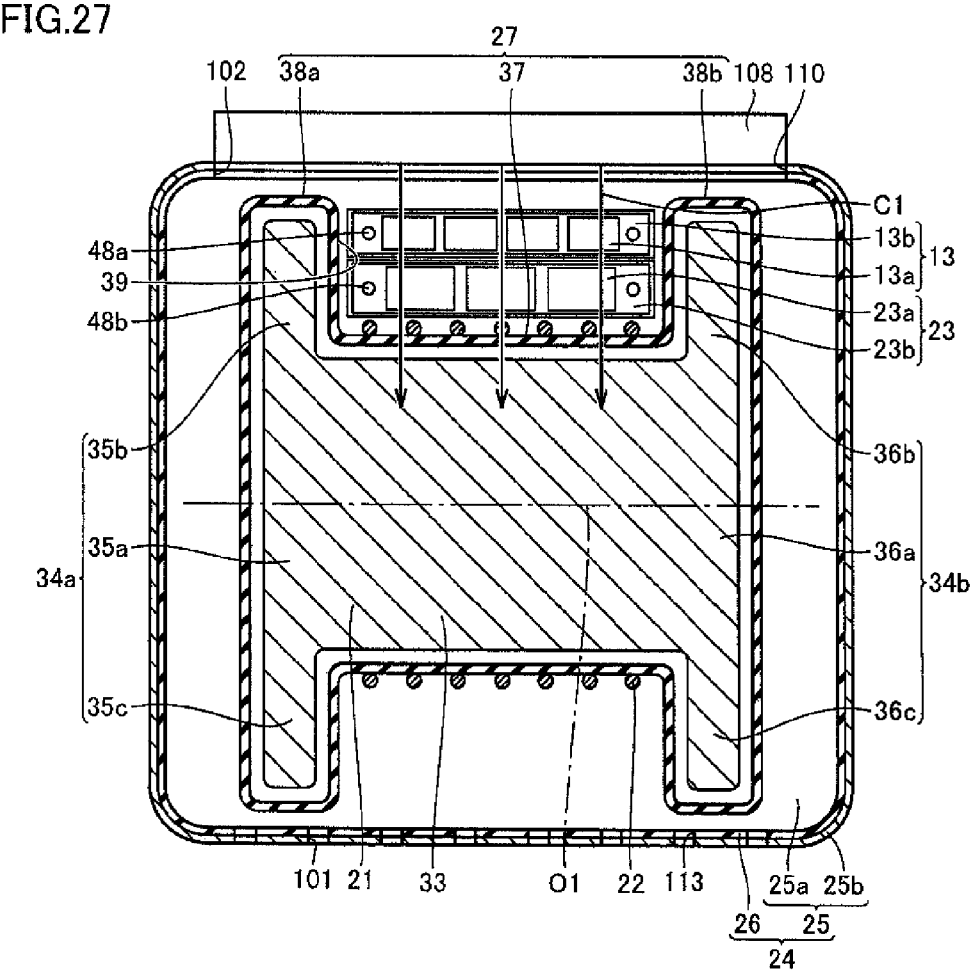
FIG. 27 is a cross-sectional view showing a second modification of power reception device 11.

FIG. 27 is a cross-sectional view showing a second modification of power reception device 11. In the example shown in FIG. 27, ferrite core 21 is formed to have an H shape. In the example shown in FIG. 27, a projection length of projecting portions 35b and 36b and a projection length of projecting portions 35c and 36c are substantially the same.

Also in the example shown in FIG. 27, rectifier 13 is disposed upstream in the flow direction of cooling air C1 from capacitor 23. Capacitor 23 is disposed upstream in the flow direction of cooling air C1 from second coil 22.

Figure 28:
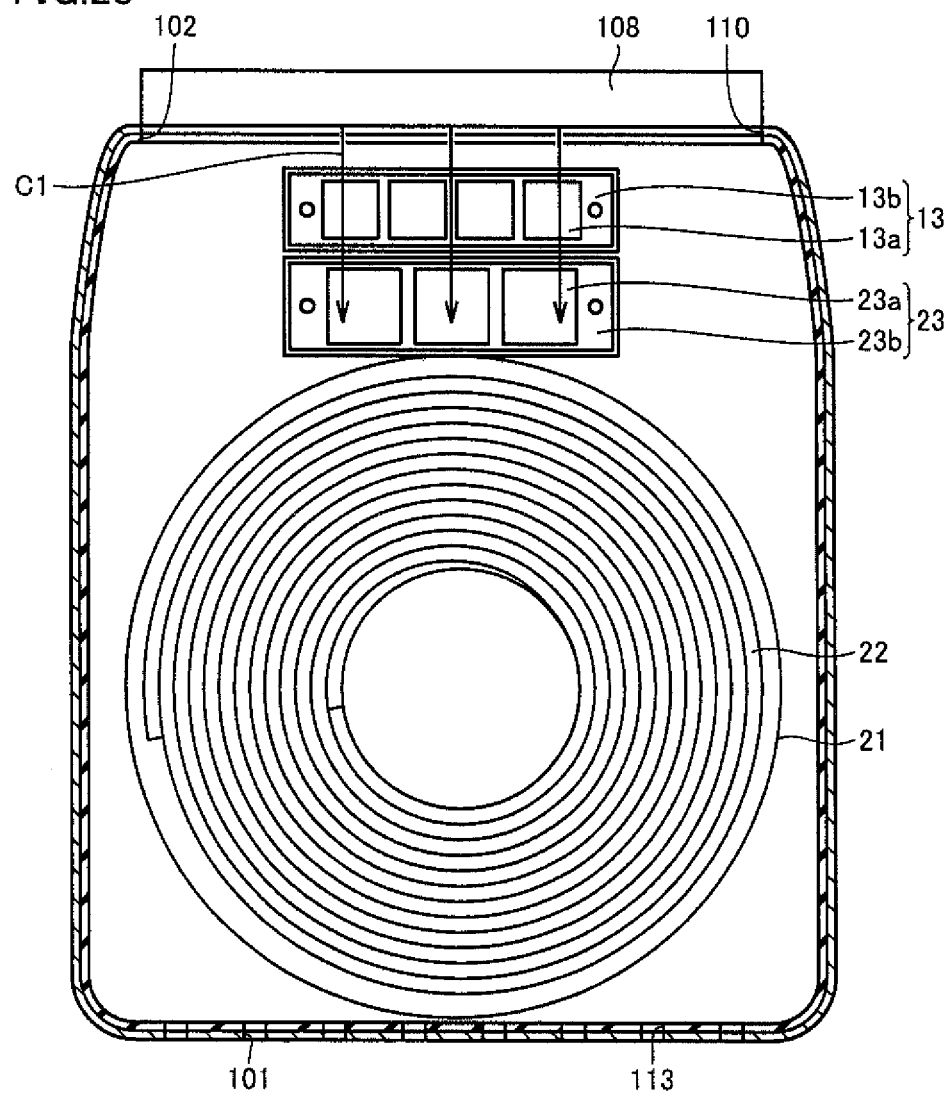
FIG. 28 is a cross-sectional view showing a third modification of power reception device 11.

FIG. 28 is a cross-sectional view showing a third modification of power reception device 11. In the example shown in FIG. 28, ferrite core 21 is formed to have a circular plate shape, and second coil 22 is disposed on the lower surface of ferrite core 21 having a plate shape. In the example shown in FIG. 28, second coil 22 is not wound around ferrite core 21. As such, second coil 22 provided on ferrite core 21 is not limited to second coil 22 wound around the circumferential surface of ferrite core 21, but also includes second coil 22 disposed around ferrite core 21.

In the example shown in FIG. 28, capacitor 23 is disposed upstream in the flow direction of cooling air C1 from second coil 22. Rectifier 13 is disposed upstream in the flow direction of cooling air C1 from capacitor 23.

Thus, rectifier 13 can be cooled well also in the example shown in FIG. 28.

Although power reception device 11 has been described with reference to FIGS. 27 and 28, the H-shaped core and the circular core can of course be applied to power transmission device 50 as well.

In power reception device 11 described in the embodiments above, an electromagnetic induction coil that receives electric power from second coil 22 by electromagnetic induction may be disposed so as to be connected to rectifier 13. Likewise, an electromagnetic induction coil that transmits electric power to first coil 58 by electromagnetic induction may be disposed so as to be connected to high-frequency power driver 54.

It is noted that the invention described in the embodiments above can of course be applied to electric power transfer by electromagnetic induction as well.

It should be understood that the embodiments disclosed herein are illustrative and non-restrictive in every respect. The scope of the present invention is defined by the terms of the claims, and is intended to include any modifications within the scope and meaning equivalent to the terms of the claims. Furthermore, the numerical values and the like mentioned above are illustrative, and the numerical values and ranges mentioned above are not restrictive.

INDUSTRIAL APPLICABILITY

The present invention is suitable for a power reception device and a power transmission device.

REFERENCE SIGNS LIST 10 electrically powered vehicle; 11, 91 power reception device; 13 rectifier; 13a, 23a, 59a element; 13b, 23b, 59b substrate; 14 converter; 15 battery; 16 power control unit; 17 motor unit; 18L, 18R front wheel; 19L, 19R rear wheel; 20, 96 power reception unit; 21, 57 ferrite core; 22, 58, 92, 94, 97, 99 coil; 23, 59, 95, 98 capacitor; 24, 60 case; 25, 62 shield; 25a top plate portion; 25b, 62b circumferential wall portion; 25c to 25f wall portion; 26 cover portion; 40, 74, 74a, 74b insulation member; 41 insulation member for power reception unit; 42, 42a insulation member for device; 43 insulation member for coil; 44 insulation member for capacitor; 45 thermally conductive member.

The invention claimed is:

1. A power reception device that receives electric power in a non-contact manner from a power transmission unit including a first coil, comprising:
   a case having an accommodation portion formed therein;
   a core disposed in said case;
   a second coil disposed in said case and provided on said core;
   an electrical device disposed in said case and connected to said second coil;
   an insulation member disposed between an inner surface of said case and said second coil, and between the inner surface of said case and said electrical device; and
   a cooling device that causes a flow of a coolant to cool said second coil and said electrical device,
   said second coil and said electrical device being attached to the inner surface of said case with said insulation member interposed therebetween,
   said electrical device being disposed upstream in a flow direction of said coolant from said second coil, wherein said electrical device includes a capacitor connected to said second coil, and a rectifier that rectifies a current received by said second coil, said rectifier is disposed upstream in the flow direction of said coolant from said capacitor, and said capacitor is disposed upstream in the flow direction of said coolant from said second coil.

2. The power reception device according to claim 1, wherein
said cooling device supplies the coolant into said case.

3. The power reception device according to claim 2, wherein
said second coil is formed to surround a first winding axis, and
said cooling device supplies said coolant in a first intersecting direction that intersects a direction in which said first winding axis extends.

4. The power reception device according to claim 1, wherein
said case is sealed.

5. The power reception device according to claim 1, wherein
said second coil and a capacitor connected to said second coil form a power reception unit that receives electric power in a non-contact manner from said power transmission unit, and
a difference between a natural frequency of said power transmission unit and a natural frequency of said power reception unit is 10% or less of the natural frequency of said power reception unit.

6. The power reception device according to claim 1, wherein
said second coil and a capacitor connected to said second coil form a power reception unit that receives electric power in a non-contact manner from said power transmission unit, and
a coupling coefficient between said power reception unit and said power transmission unit is 0.1 or less.

7. The power reception device according to claim 1, wherein
said second coil and a capacitor connected to said second coil form a power reception unit that receives electric power in a non-contact manner from said power transmission unit, and
said power reception unit receives electric power from said power transmission unit through at least one of a magnetic field and an electric field, said magnetic field being formed between said power reception unit and said power transmission unit and oscillating at a specific frequency, said electric field being formed between said power reception unit and said power transmission unit and oscillating at the specific frequency.

8. A power reception device that receives electric power in a non-contact manner from a power transmission unit including a first coil, comprising:
a case having an accommodation portion formed therein;
a core disposed in said case;
a second coil disposed in said case and provided on said core,
an electrical device disposed in said case and connected to said second coil;
an insulation member disposed between an inner surface of said case and said second coil, and between the inner surface of said case and said electrical device; and
a cooling device that causes a flow of a coolant to cool said second coil and said electrical device, said second coil and said electrical device being attached to the inner surface of said case with said insulation member interposed therebetween,
said electrical device being disposed upstream in a flow direction of said coolant from said second coil, wherein
said electrical device includes a capacitor connected to said second coil, and a rectifier that rectifies a current received by said second coil,
said capacitor is disposed upstream in the flow direction of said coolant from said rectifier, and
said rectifier is disposed upstream in the flow direction of said coolant from said second coil.

9. A power reception device that receives electric power in a non-contact manner from a power transmission unit including a first coil, comprising:
a case having an accommodation portion formed therein;
a core disposed in said case;
a second coil disposed in said case and provided on said core;
an electrical device disposed in said case and connected to said second coil;
an insulation member disposed between an inner surface of said case and said second coil, and between the inner surface of said case and said electrical device; and
a cooling device that causes a flow of a coolant to cool said second coil and said electrical device,
said second coil and said electrical device being attached to the inner surface of said case with said insulation member interposed therebetween,
said electrical device being disposed upstream in a flow direction of said coolant from said second coil, wherein
said second coil is formed to surround a first winding axis,
said core includes a first stem portion having said second coil wound therearound, a first magnetic pole portion formed at a first end portion of said first stem portion and extending in a first intersecting direction that intersects a direction in which said first winding axis extends, and a second magnetic pole portion formed at a second end portion of said first stem portion and extending in said first intersecting direction,
a width of said first stem portion in said first intersecting direction is smaller than a length of said first magnetic pole portion and a length of said second magnetic pole portion in said first intersecting direction,
a first central portion positioned at a center of said first magnetic pole portion in said first intersecting direction and a second central portion positioned at a center of said second magnetic pole portion in said first intersecting direction are displaced in said first intersecting direction from a third central portion positioned at a center of said first stem portion in said first intersecting direction, and
said electrical device is disposed so as to be displaced from said first stem portion in said first intersecting direction, and is disposed between said first magnetic pole portion and said second magnetic pole portion.

10. A power transmission device that transmits electric power in a non-contact manner to a power reception unit including a second coil, comprising:
a case having an accommodation portion;
a core disposed in said case;
a first coil disposed in said case and provided on said core;
a second electrical device disposed in said case and connected to said first coil;

an insulation member disposed between an inner surface of said case and said first coil, and between the inner surface of said case and said second electrical device; and a cooling device that causes a flow of a coolant to cool said first coil and said second electrical device, said first coil and said second electrical device being attached to the inner surface of said case with said insulation member interposed therebetween, said second electrical device being disposed upstream in a flow direction of said coolant from said first coil, wherein said first coil is formed to surround a second winding axis, said core includes a second stem portion having said first coil wound therearound, a third magnetic pole portion formed at a third end portion of said second stem portion and extending in a second intersecting direction that intersects a direction in which said second winding axis extends, and a fourth magnetic pole portion formed at a fourth end portion of said second stem portion and extending in said second intersecting direction, a width of said second stem portion in said second intersecting direction is smaller than a length of said third magnetic pole portion and a length of said fourth magnetic pole portion in said second intersecting direction, a fourth central portion positioned at a center of said third magnetic pole portion in said second intersecting direction and a fifth central portion positioned at a center of said fourth magnetic pole portion in said second intersecting direction are displaced in said second intersecting direction from a sixth central portion positioned at a center of said second stem portion in said second intersecting direction, and said second electrical device is disposed so as to be displaced from said second stem portion in said second intersecting direction, and is disposed between said third magnetic pole portion and said fourth magnetic pole portion.

11. The power transmission device according to claim 10, wherein
said second electrical device includes a capacitor connected to said first coil.

12. The power transmission device according to claim 10, wherein
said cooling device supplies the coolant into said case.

13. The power transmission device according to claim 12, wherein
said first coil is formed to surround a second winding axis, and
said cooling device supplies said coolant in a second intersecting direction that intersects a direction in which said second winding axis extends.

14. The power transmission device according to claim 10, wherein
said case is sealed.

15. The power transmission device according to claim 10, wherein
said first coil and a capacitor connected to said first coil form a power transmission unit that transmits electric power in a non-contact manner to said power reception unit, and
a difference between a natural frequency of said power transmission unit and a natural frequency of said power reception unit is 10% or less of the natural frequency of said power reception unit.

16. The power transmission device according to claim 10, wherein
said first coil and a capacitor connected to said first coil form a power transmission unit that transmits electric power in a non-contact manner to said power reception unit, and
a coupling coefficient between said power reception unit and said power transmission unit is 0.1 or less.

17. The power transmission device according to claim 10, wherein
said first coil and a capacitor connected to said first coil form a power transmission unit that transmits electric power in a non-contact manner to said power reception unit, and
said power transmission unit transmits electric power to said power reception unit through at least one of a magnetic field and an electric field, said magnetic field being formed between said power reception unit and said power transmission unit and oscillating at a specific frequency, said electric field being formed between said power reception unit and said power transmission unit and oscillating at the specific frequency.

* * * * *